(12) United States Patent
Sakai et al.

(10) Patent No.: US 9,509,531 B2
(45) Date of Patent: Nov. 29, 2016

(54) DECISION FEEDBACK EQUALIZER

(71) Applicant: FUJITSU LIMITED, Kawasaki-shi, Kanagawa (JP)

(72) Inventors: Yasufumi Sakai, Fuchu (JP); Toshihiko Mori, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/949,592

(22) Filed: Nov. 23, 2015

(65) Prior Publication Data

US 2016/0191276 A1 Jun. 30, 2016

(30) Foreign Application Priority Data

Dec. 25, 2014 (JP) .................... 2014-263435

(51) Int. Cl.
*H04L 25/03* (2006.01)
*H04L 27/02* (2006.01)

(52) U.S. Cl.
CPC ......... *H04L 25/03057* (2013.01); *H04L 27/02* (2013.01)

(58) Field of Classification Search
CPC ..... H03C 1/06; H03C 3/08; H04L 25/03057; H04L 27/02
USPC ........................................................ 375/233
See application file for complete search history.

(56) References Cited

U.S. PATENT DOCUMENTS

2002/0172275 A1* 11/2002 Birru ..................... H04L 1/0054
375/233

2005/0201491 A1* 9/2005 Wei ....................... H04L 7/0337
375/326

(Continued)

FOREIGN PATENT DOCUMENTS

| JP | 2011-244284 A | 12/2011 |
|----|---------------|---------|
| JP | 2012-039267 A | 2/2012 |
| WO | WO 2009/113462 A1 | 9/2009 |

OTHER PUBLICATIONS

Park, Peter. "A 4PAM/2PAM Coaxial Cable Receiver Analog Front-End Targeting 40G B/S in 90 NM CMOS", A thesis submitted in conformity with the requirements for the degree of Master of Applied Science Graduate Department of Electrical and Computer Engineering, University of Toronto, 2008.

*Primary Examiner* — Michael Neff
(74) *Attorney, Agent, or Firm* — Arent Fox LLP

(57) ABSTRACT

A decision feedback equalizer for N-level amplitude modulated signal, includes: (N−1) level conversion circuits to add (N−1) shifting voltages to the amplitude modulated signal respectively; (N−1)×N determination feedback equalization-correction circuits to perform N types of decision feedback equalization processing, each of which adding each of N-level offset voltages corresponded to any one of N levels of a reception data ahead of one data cycle, on each of the (N−1) level shifted signals to generate (N−1) sets of N equalization correction signals; (N−1)×N comparison circuits; (N−1)×N first latch circuits; (N−1) selection circuits to select a comparison result of the N comparison circuits in each (N−1) sets; (N−1) second latch circuits; and a decoder, wherein each of the (N−1) selection circuits selects an equalization-correction signal among the N equalization-correction signals in each (N−1) set according to outputs latched by the (N−1) second latch circuits.

6 Claims, 27 Drawing Sheets

(56) References Cited

U.S. PATENT DOCUMENTS

| | | | |
|---|---|---|---|
| 2008/0310495 A1* | 12/2008 | Bulzacchelli | H04L 25/03057 375/233 |
| 2010/0327924 A1 | 12/2010 | Hasegawa et al. | |
| 2012/0033726 A1 | 2/2012 | Shibasaki | |
| 2013/0148702 A1* | 6/2013 | Payne | H03M 1/0607 375/219 |
| 2013/0342240 A1* | 12/2013 | Amirkhany | H03K 5/24 327/50 |

* cited by examiner

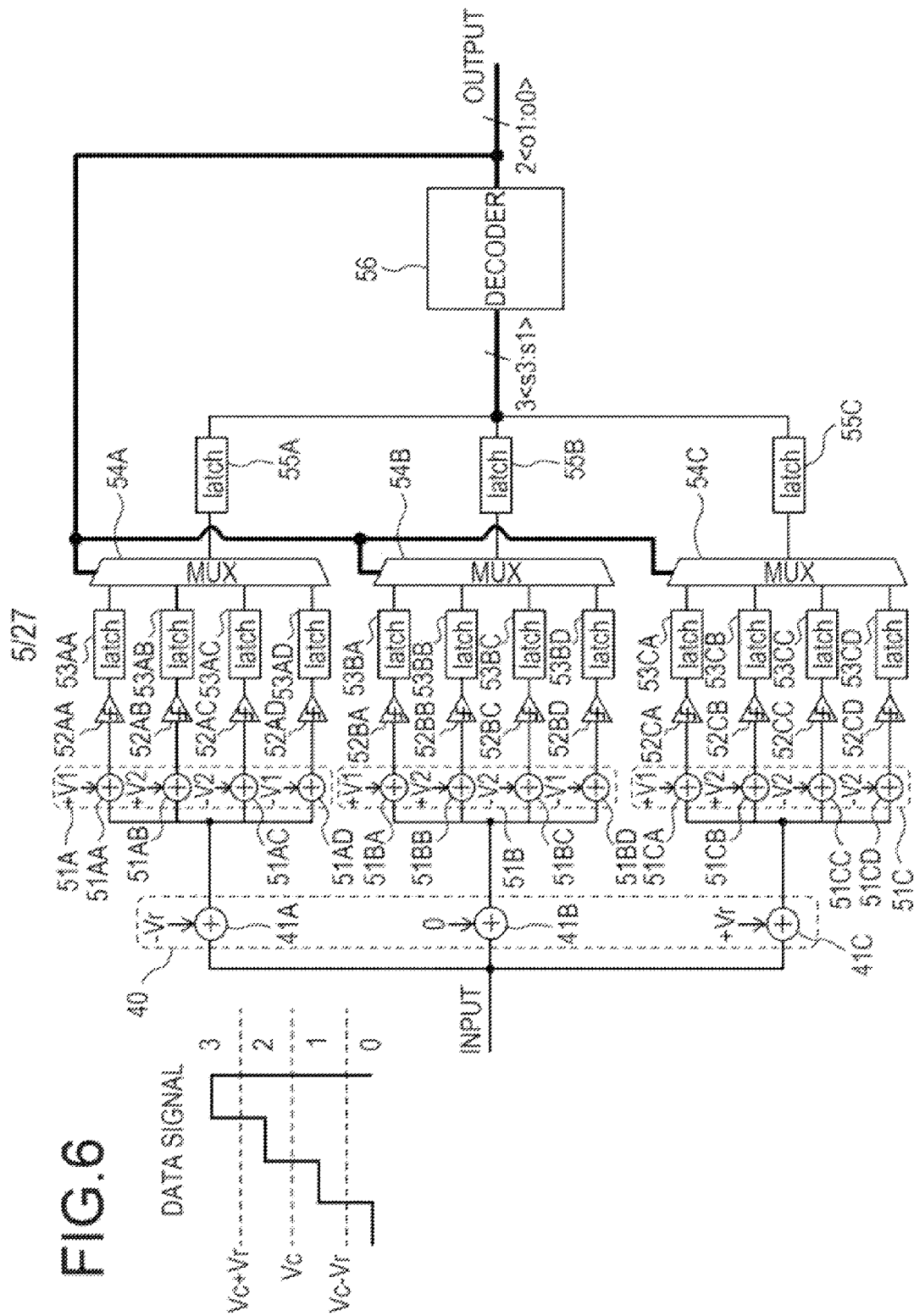

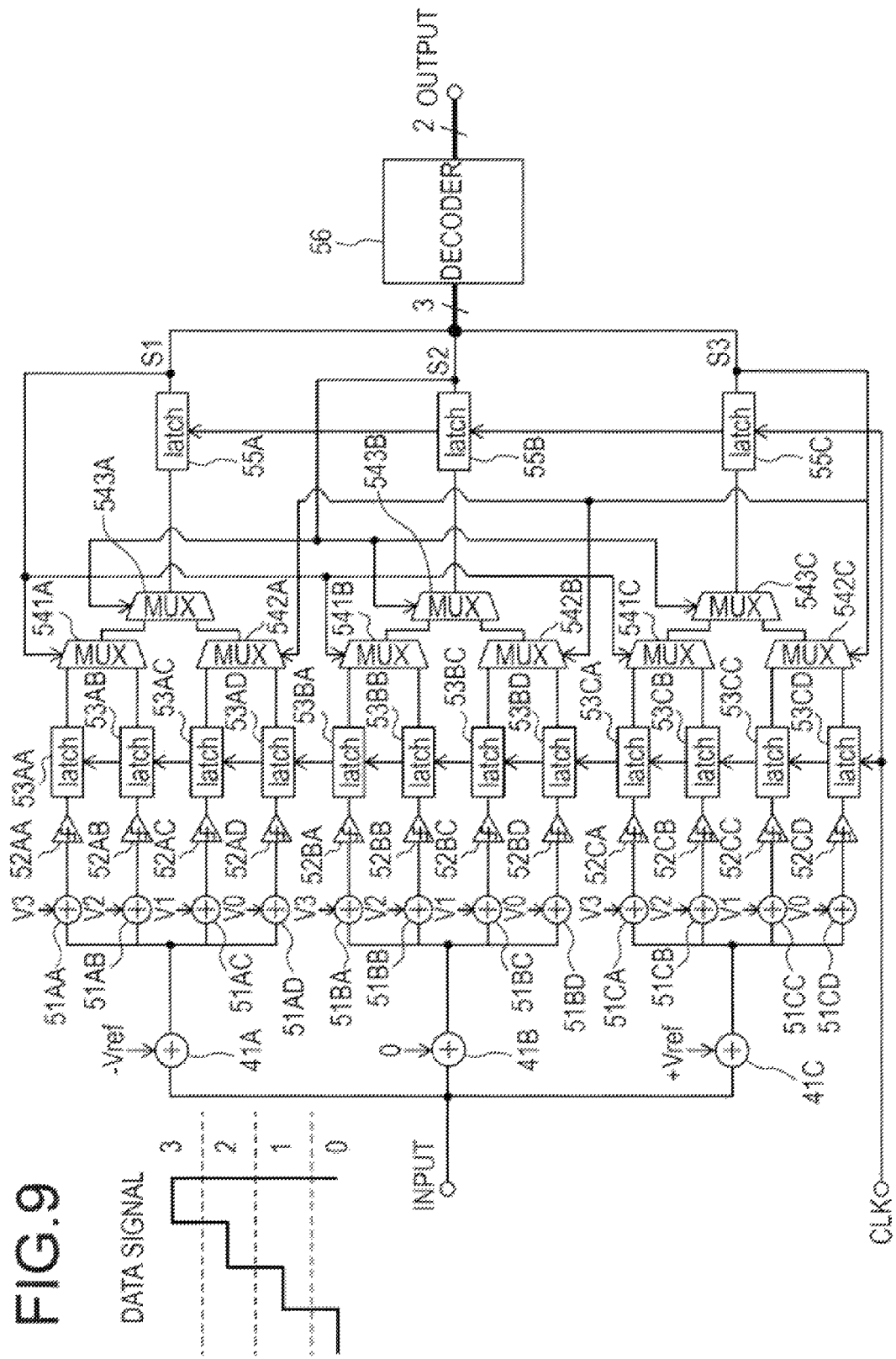

| DATA | s1 | s2 | s3 |
|---|---|---|---|
| 3 | 1 | 1 | 1 |
| 2 | 0 | 1 | 1 |
| 1 | 0 | 0 | 1 |
| 0 | 0 | 0 | 0 |

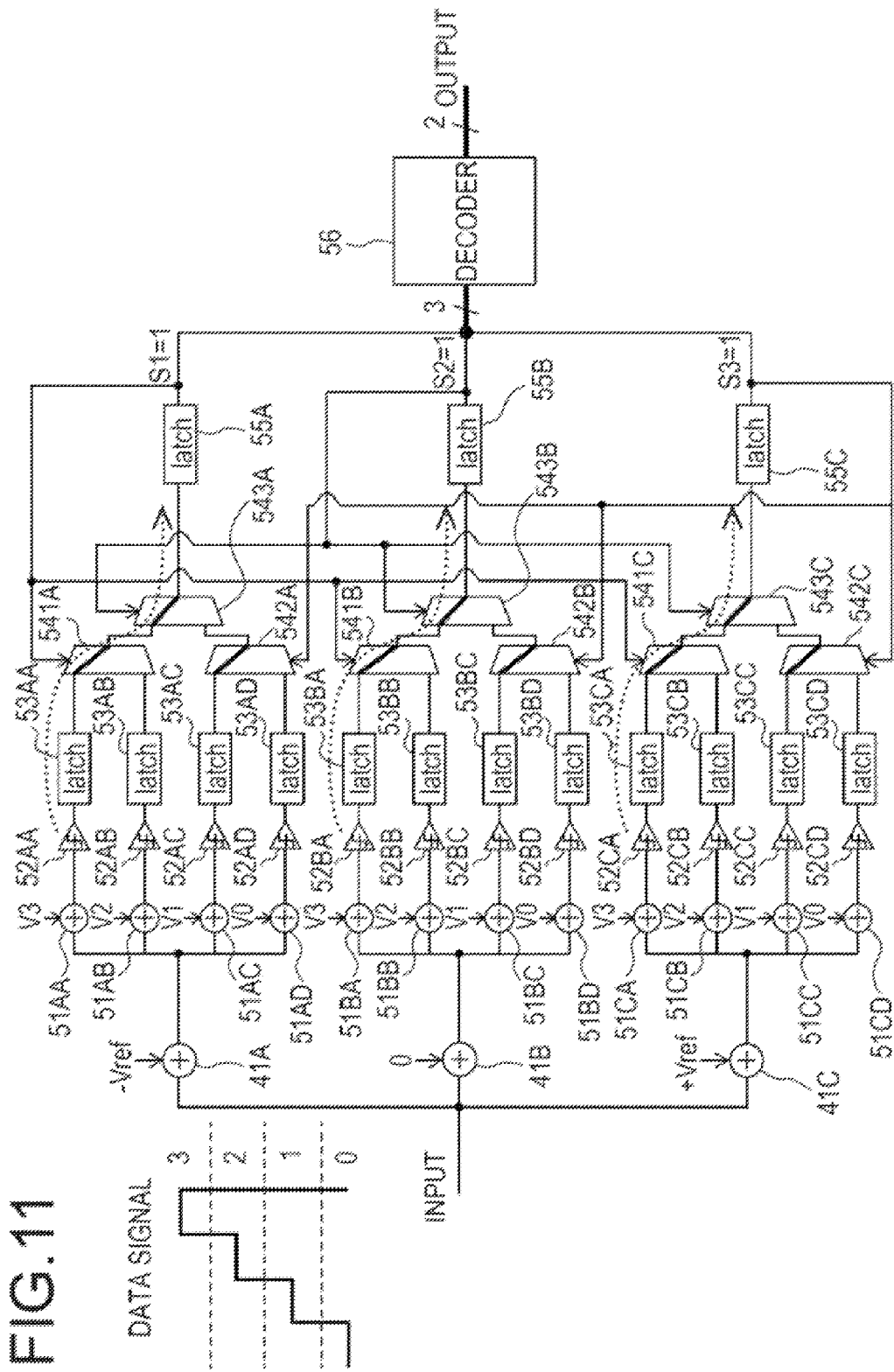

FIG.18

| DATA | s1X | s2X | s3X | s1Y | s2Y | s3Y |
|---|---|---|---|---|---|---|
| 3 | 1 | 1 | 1 | 1 | 1 | 1 |
| 2 | 0 | 1 | 1 | 0 | 1 | 1 |
| 1 | 0 | 0 | 1 | 0 | 0 | 1 |
| 0 | 0 | 0 | 0 | 0 | 0 | 0 |

FIG.22

RELATION OF DATA AND LATCH OUTPUT

| DATA | s1 | s2 | s3 | s4 | s5 | s6 | s7 |
|---|---|---|---|---|---|---|---|
| 7 | 1 | 1 | 1 | 1 | 1 | 1 | 1 |
| 6 | 0 | 1 | 1 | 1 | 1 | 1 | 1 |
| 5 | 0 | 0 | 1 | 1 | 1 | 1 | 1 |
| 4 | 0 | 0 | 0 | 1 | 1 | 1 | 1 |
| 3 | 0 | 0 | 0 | 0 | 1 | 1 | 1 |
| 2 | 0 | 0 | 0 | 0 | 0 | 1 | 1 |
| 1 | 0 | 0 | 0 | 0 | 0 | 0 | 1 |
| 0 | 0 | 0 | 0 | 0 | 0 | 0 | 0 |

FIG.27

| AMPLITUDE MODULATION LEVEL:n | NUMBER OF BITS OF DECODER (VALUE AFTER THE DECIMAL POINT $\log_2(n)$ IS ROUNDED UP) | $\log_2(n)$ |
|---|---|---|
| 2 | 1 | 1 |
| 3 | 2 | 1.584963 |
| 4 | 2 | 2 |
| 5 | 3 | 2.321928 |
| 6 | 3 | 2.584963 |
| 7 | 3 | 2.807355 |
| 8 | 3 | 3 |
| 9 | 4 | 3.169925 |
| 10 | 4 | 3.321928 |
| 11 | 4 | 3.459432 |
| 12 | 4 | 3.584963 |
| 13 | 4 | 3.70044 |
| 14 | 4 | 3.807355 |
| 15 | 4 | 3.906891 |
| 16 | 4 | 4 |
| 17 | 5 | 4.087463 |

DECISION FEEDBACK EQUALIZER

CROSS-REFERENCE TO RELATED APPLICATION

This application is based upon and claims the benefit of priority from the prior Japanese Patent Application No. 2014-263435, filed on Dec. 25, 2014, the entire contents of which are incorporated herein by reference.

FIELD

The embodiments discussed herein are related to a decision feedback equalizer.

BACKGROUND

In recent years, the performance of a component such as a CPU constituting an information processing system such as a server or a computer, especially the bandwidth of the component is greatly increasing. Therefore, in order to increase the total bandwidth of the entire information processing system, the speed of a transceiver circuit transmitting and receiving data between chips such as the CPU and between a plurality of elements or circuit blocks within the chip needs to be improved. Further, the speed of a transceiver circuit transmitting and receiving data between boards or between cases also needs to be improved. In the transceiver circuit performing a high speed data communication, a signal equalization circuit (equalizer) is utilized so as to compensate for a degradation of data signal occurring in a transmission line.

There is a speculative type decision feedback equalizer (DFE) as a type of equalizer. The DFE applies an offset voltage to the data signal, for which a comparator has not yet made a determination, by an amount of the deterioration of signal due to an Inter-Symbol Interference (ISI) generated by the previous data so as to compensate for the deterioration of signal due to the ISI. In the DFE, since the data signal is required to be compensated for each bit, a selection circuit, it may be indicated as MUX, selecting a determination result of the comparator is required to select the signal each at a time for 1 bit width of data (1 unit interval (UI)). Accordingly, a delay time of a signal route for controlling the MUX is required to be less than 1UI of data.

The speculative type DFE circuit applies a plurality of types of offset voltages as many as the types of values capable of being taken by the data to the signal in advance, and selects the signal to which the offset voltage corresponding to the determined data is applied at the time when the data is determined. Accordingly, an unnecessary processing is caused, but a time required for a processing of giving the offset voltage may be reduced as compared to a case where the offset voltage is given after the data is determined.

A data transmission scheme of a multi-level modulation is used in order to increase a data transmission amount per unit time. As for a configuration of the speculative type DFE with the multi-level modulation, a method in which a decoder is used is known. For example, when a transmission scheme is a four-level pulse amplitude modulation (PAM4) using a pulse amplitude modulation (PAM), the MUX needs to know "0" or "1" of a high order bit and "0" or "1" of a low order bit of the data in order to select a single signal from four input signals. Accordingly, the MUX is controlled by two control signals. Here, since three comparators are required in order to determine four-level amplitude information in PAM4, three MUXs are required in the DFE for PAM4. Accordingly, a decoder for generating two signals that control the MUXs by using three signals output from the MUXs is used.

However, since the decoder not required in the speculative DFE using two-level modulation is added, a delay time of the signal route for controlling the MUX is increased by a delay time for the decoder. As a result, an operation speed of the DFE becomes slower and it becomes difficult to further increase the data rate.

Related techniques are disclosed in, for example, Japanese Laid-open Patent Publication No. 2012-039267, International Publication Pamphlet No. WO 2009/113462, and Japanese Laid-open Patent Publication No. 2011-244284.

Related techniques are also disclosed in a non-patent literature, i.e., "A 4PAM/2PAM COAXIAL CABLE RECEIVER ANALOG FRONT-END TARGETING 40G B/S IN 90-NM CMOS", Peter Park, A thesis submitted in conformity with the requirements for the degree of Master of Applied Science Graduate Department of Electrical and Computer Engineering, University of Toronto.

SUMMARY

According to an aspect of the invention, a decision feedback equalizer for N-level amplitude modulated signal of a reception data, wherein N is an integer of 2 or more, the decision feedback equalizer includes: (N−1) level conversion circuits configured to add (N−1) shifting voltages to the N-level amplitude modulated signal respectively to generate (N−1) level shifted signals; (N−1)×N determination feedback equalization and correction circuits configured to perform N types of decision feedback equalization processing, each of which adding each of N-level offset voltages corresponded to any one of N levels of the reception data ahead of one data cycle, on each of the (N−1) level shifted signals to generate (N−1) sets of N equalization correction signals; (N−1)×N comparison circuits configured to compare the N equalization correction signals in each (N−1) sets with a reference voltage; (N−1)×N first latch circuits configured to latch comparison results of N comparison circuits in each (N−1) sets; (N−1) selection circuits configured to select a comparison result among the comparison results of the N comparison circuits in each (N−1) sets; (N−1) second latch circuits configured to latch outputs of the (N−1) selection circuits; and a decoder configured to decode the outputs of the (N−1) second latch circuits to determine output data having N levels, wherein each of the (N−1) selection circuits is configured to select an equalization correction signal among the N equalization correction signals in each (N−1) set according to outputs latched by the (N−1) second latch circuits.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A illustrates a signal route for a case where the data ahead of 1-bit is "1" and FIG. 4 illustrates a signal route for a case where the data ahead of 1-bit is "0";

FIG. 6 is a diagram illustrating a configuration of the speculative type DFE for a case of multi-level modulation;

FIG. 7A illustrates the delay in a case of a circuit for two-level modulation of FIG. 3 and FIG. 7B illustrates the delay in a case of a circuit for four-level modulation of FIG. 6;

FIG. 9 is a diagram illustrating an example of a specific configuration of the MUX of the speculative type DFE of the first embodiment;

FIG. 11 is a diagram illustrating a signal route in the DFE of FIG. 9 when a value of the reception data signal ahead of 1UI is "3";

FIG. 18 is a table illustrating a relation between values of the reception data signal and data values input to two decoders in the second embodiment;

FIG. 22 is a table illustrating a relation between values of the reception data signal and data values input to two decoders in the fifth embodiment;

FIG. 27 is a table illustrating a relation between a value "n" of the reception data signal, the number of bits of the decoder corresponding to the value, and $\log_2(n)$ in the sixth embodiment.

DESCRIPTION OF EMBODIMENTS

In the following, embodiments of the speculative type DFE which receives the data signal having a high data rate transmitted in a data transmission scheme of multi-level modulation will be described with reference to drawings, but a general speculative type DFE will be described first.

Figure 1:
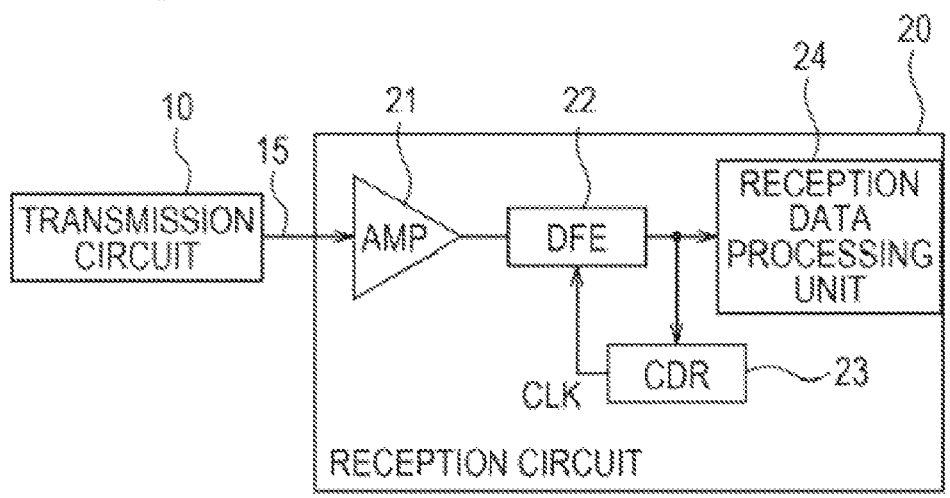
FIG. 1 is a diagram illustrating a configuration of a communication system provided between the chips or within the chip.

FIG. 1 is a diagram illustrating a configuration of a communication system provided between chips and in the chip. The communication system includes a transmission circuit 10, a transmission path 15, and a reception circuit 20. The transmission circuit 10 performs, for example, a parallel to serial conversion on the transmission data and then, outputs the converted data to the transmission path 15 synchronously with a transmission clock. A change period of the data signal is referred to as 1UI (1 Unit Interval). The reception circuit 20 receives the transmitted data signal from the transmission path 15.

The reception circuit 20 includes a preamplifier (AMP) 21 which amplifies the data signal received from the transmission path 15, a decision feedback equalizer (DFE) 22, a clock data recovery (CDR) circuit 23, and a reception data processing unit 24. The DFE 22 is a circuit that includes a comparator (a comparison circuit) therein and applies an offset voltage to the data signal for which the comparator has not yet made a determination, by an amount of a deterioration of signal caused by an Inter-Symbol Interference (ISI) generated by the previous data to compensate for the deterioration of the signal due to the ISI. The CDR circuit 23 is a circuit to recover the transmission clock from a changing edge of the reception data output from the DFE 22. The reception data processing unit 24 is an internal circuit to process the reception data output from the DFE 22. A demultiplexer (DEMUX) performing the serial-to-parallel conversion on the reception data is provided in the DFE 22 but, may be provided in the reception data processing unit 24. Here, descriptions will be made on an assumption that the DEMUX is provided in an output stage of the DFE 22.

Figure 2:
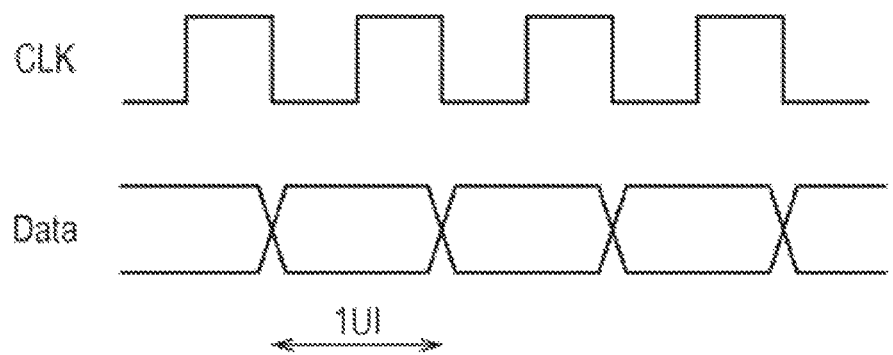
FIG. 2 is a time chart illustrating a phase relationship between a reception clock recovered by a clock data recovery (CDR) and a reception data signal from an amplifier (AMP) in the DFE.

FIG. 2 is a time chart illustrating a phase relationship between a reception clock CLK recovered by the CDR circuit 23 and a reception data signal from the AMP 21 in the DFE 22. FIG. 2 illustrates an example referred to as full-rate at which the reception data signal is changed per one period of the reception clock CLK and, a change period of the reception data signal, that is, one period of the CLK corresponds to 1UI.

Figure 3:
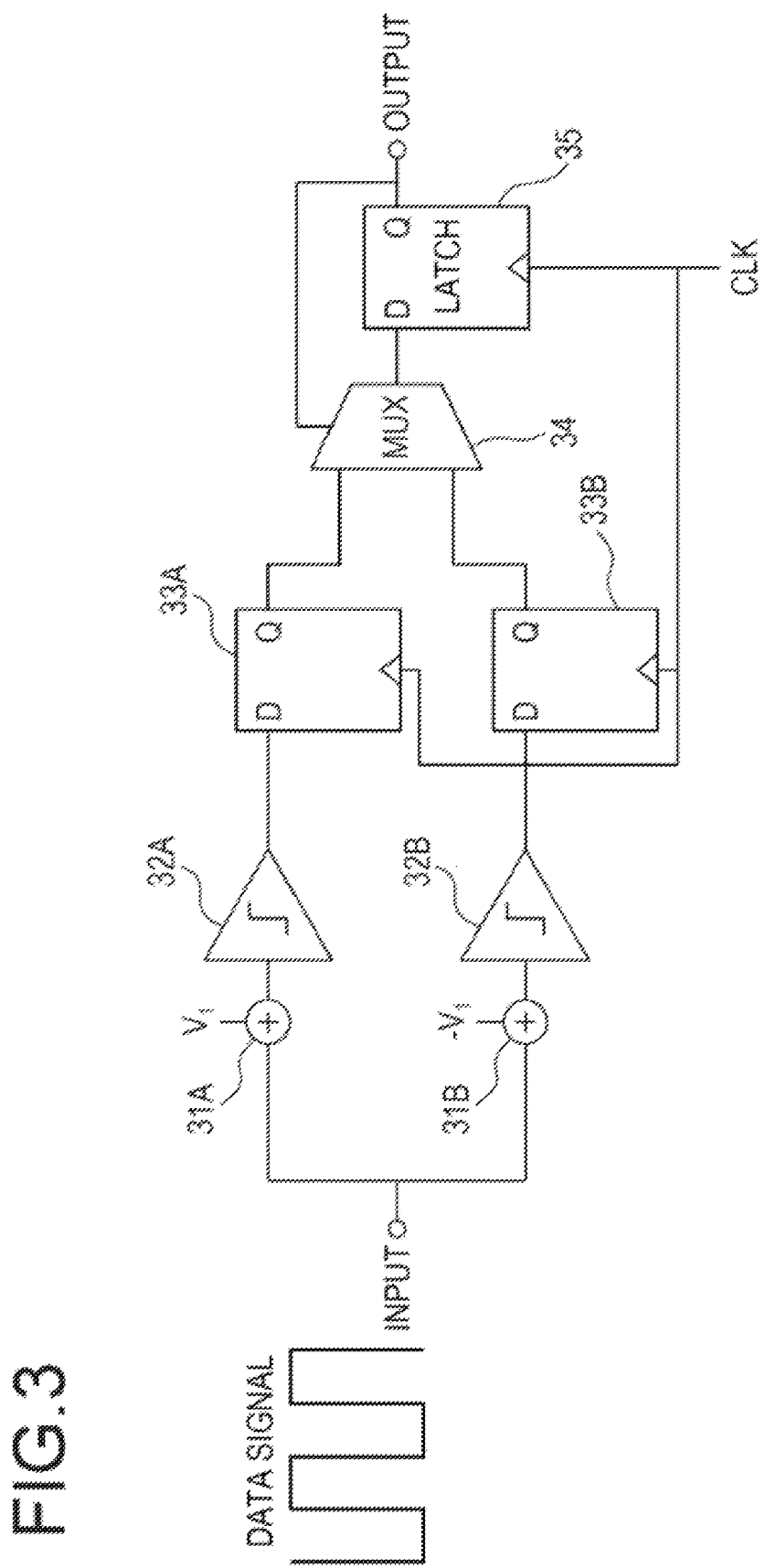
FIG. 3 is a diagram illustrating a configuration of a speculative type DFE for a case of two-level modulation.

FIG. 3 is a diagram illustrating a configuration of a speculative type DFE for a case of two-level modulation.

The DFE includes two addition circuits 31A and 31B, two comparators (comparison circuits) 32A and 32B, two latch circuits (FFs) 33A and 33B, a MUX 34, and a latch circuit

35. The addition circuit 31A adds an offset voltage V1 to the reception data signal and the addition circuit 31B adds an offset voltage −V1 to the reception data signal. The comparator 32A compares the reception data signal, to which the offset voltage V1 is added, output from the addition circuit 31A with the reference voltage and outputs a determination result of "0" or "1". The comparator 32B compares the reception data signal, to which the offset voltage −V1 is added, output from the addition circuit 31B with the reference voltage and outputs a determination result of "0" or "1". The latch circuit 33A latches (captures) the output of the comparator 32A synchronously with the rise of the reception clock CLK. The latch circuit 33B latches the output of the comparator 32B synchronously with the rise of the reception clock CLK. The MUX 34 selects one of the outputs of the latch circuit 33A and the latch circuit 33B according to an output of the latch circuit 35. The latch circuit 35 latches the output of the selection circuit 34 synchronously with the rise of the reception clock CLK.

As illustrated in FIG. 3, since the latch circuits 33A and 33B and the latch circuit 35 latch an input synchronously with the rise of the reception clock CLK, the output of the latch circuit 35 corresponds to data formed by delaying one of the outputs of the latch circuits 33A and 33B by 1UI, that is, data ahead of 1-bit.

Figure 4A:
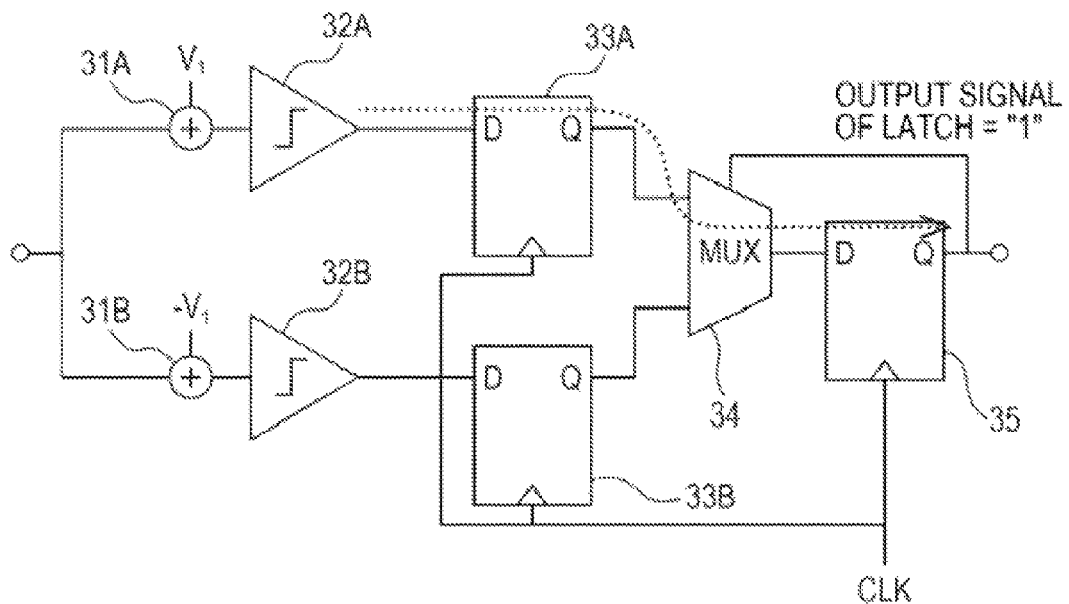
FIGS. 4A and 4B are diagrams for explaining the operations of the DFE of FIG. 3
Figure 4B:
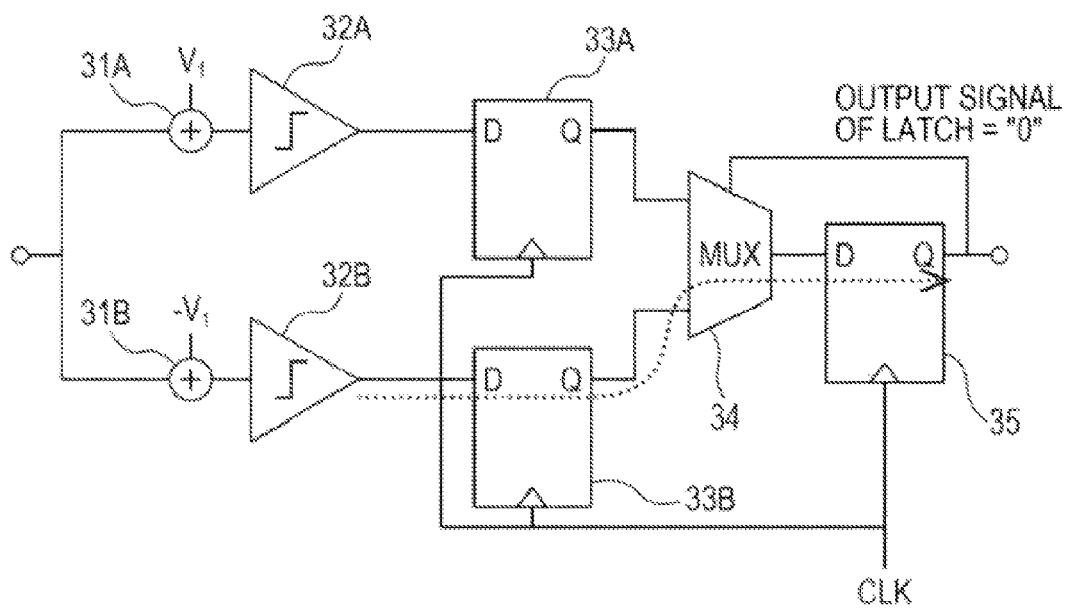

FIGS. 4A and 4B are diagrams for explaining operations of the DFE of FIG. 3, and FIG. 4A illustrates a signal route for a case where data ahead of 1-bit is "1" and FIG. 4B illustrates a signal route for a case where data ahead of 1-bit is "0."

In the signal route illustrated in FIG. 4A, the addition circuit 31A adds an offset voltage V1 to the reception data signal, that is, the offset voltage is added on the assumption that the reception data ahead of 1UI was "1." The comparator 32A determines the output of the addition circuit 31A, and the latch circuit 33A latches the output of the comparator 32A synchronously with the rise of the reception clock CLK and holds the output until the next rise of the clock. In the meantime, in the signal route illustrated in FIG. 4B, the addition circuit 31B adds an offset voltage −V1 to the reception data signal, that is, adds the offset voltage −V1 on the assumption that the reception data ahead of 1UI was "0." The comparator 32B determines the output of the addition circuit 31B, and the latch circuit 33B latches the output of the comparator 32B synchronously with the rise of the reception clock CLK and holds the output until the next rise of the clock. As described above, in the two signal routes of FIGS. 4A and 4B, two types of determination results are held such that the reception data ahead of 1UI may be any of "1" and "0."

The latch circuit 35 holds the reception data ahead of 1UI with respect to the reception data being held by the latch circuit 33A and 33B. Accordingly, when the MUX 34 selects one output of the outputs of two signal routes of FIGS. 4A and 4B according to the output of the latch circuit 35, an accurate determination result after the offset voltage is corrected according to the reception data value ahead of 1UI is obtained.

Figure 5:
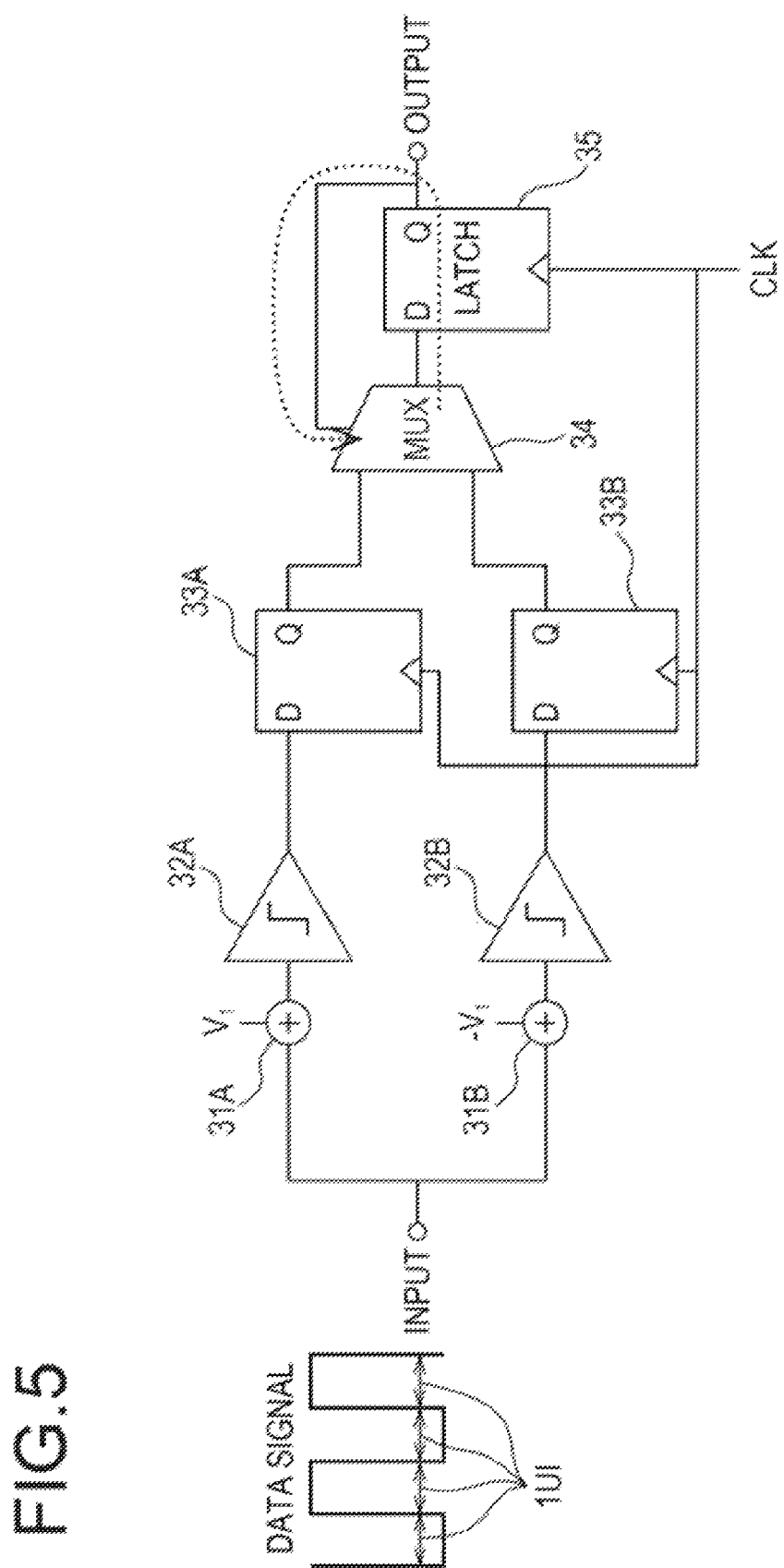
FIG. 5 is a diagram for explaining a delay in the speculative type DFE of FIG. 3.

FIG. 5 is a diagram for explaining a delay in the speculative type DFE of FIG. 3. As described above, in the speculative type DFE, since two signal routes are formed according to a type (two types in FIG. 3 and FIG. 4) of the value capable of being obtained by the reception data ahead of 1UI, a circuit scale is increased. However, it is possible to shorten a time required until the offset voltage is corrected and then the determination result is obtained after the value of the reception data ahead of 1UI is decided. In the DFE, since the reception data signal is required to be compensated for each bit, the MUX 34 which selects two determination results is required to select the data within 1UI. Accordingly, a delay time of a signal route required for controlling the MUX 34 is required to be less than 1UI. As illustrated in FIG. 5, the delay of the speculative type DFE of FIG. 3 amounts to a time spanning from the rise of the CLK to a point where the output of the latch circuit 35 is changed according to the rise of the CLK, a selection is made in the MUX 34, and the output of the MUX 34 reaches an input of the latch circuit 35, and the delay may be made smaller.

For example, in a case of non-speculative type DFE, one set of an addition circuit and a comparator is provided, the comparator is formed such that the output thereof is input to the latch circuit 35, and any one of V1 and −V1 is selected, according to the output of the latch circuit 35 to be added to the addition circuit. In this case, a total time required for change in the output of the latch circuit 35, a time taken for selecting V1 and −V1, change in the output of the addition circuit, and change in the output of the comparator corresponds to a delay, and the delay becomes large. Accordingly, there arises a problem that the latch circuit 35 is allowed to perform a latch operation before a result of determination made by adding the offset voltage according to the reception data ahead of 1UI reaches the latch circuit 35 such that an accurate DFE processing is unable to be performed. The problem becomes worse as the data rate becomes higher. Therefore, the speculative type DFE as illustrated in FIG. 3 is used in a high speed reception circuit.

As described above, a data transmission scheme of multi-level modulation is used in order to increase an amount of data transmission per unit time. A method using a decoder is known as a configuration of the speculative type DFE for a case of a data transmission scheme of multi-level modulation.

FIG. 6 is a diagram illustrating a configuration of a speculative type DFE for a case of multi-level modulation. The DFE of FIG. 6 receives data subjected to four-level pulse amplitude modulation (PAM4) by using the PAM. The four-level modulated data signal takes a data value with four levels of "0," "1," "2," and "3," and a determination for the level "0" or "1" of the data value is made by applying a shift voltage of Vc−Vr, a determination for the level "1" or "2" of the data value is made by applying a shift voltage of Vc, and a determination for the level "2" or "3" of the data value is made by applying a shift voltage of Vc+Vr.

The DFE includes a level conversion circuit 40, three sets of determination feedback equalization and correction circuits 51A-51C, 3×4 comparators 52AA-52CD, 3×4 first latch circuits 53AA-53CD, and three MUXs 54A-54C. The DFE further includes three second latch circuits 55A-55C and the decoder 56.

The level conversion circuit 40 includes a first, second, and third level conversion circuits 41A-41C and each of the first to third level conversion circuits 41A-41C includes an addition circuit. The first level conversion circuit 41A generates a first shift signal by adding a shift voltage of −Vr to the reception data signal (input). The second level conversion circuit 41B generates a second shift signal by adding a shift voltage of 0V, that is, without adding a voltage to the reception data signal. The third level conversion circuit 41C generates a third shift signal by adding a shift voltage of −Vr to the reception data signal.

The first determination feedback equalization and correction circuit 51A includes four addition circuits 51AA-51AD. The addition circuits 51AA-51AD perform a determination feedback equalization processing in which offset voltages of +V1, +V2, −V2, and −V1 are added to the output of the first level conversion circuit 41A and generate four equalized correction signals. The second determination feedback equalization and correction circuit 51B and the third determination feedback equalization and correction circuit 51C have the same configuration as the first determination feedback equalization and correction circuit 51A. The second determination feedback equalization and correction circuit 51B performs the determination feedback equalization processing on the output of the second level conversion circuit 41B, and the third determination feedback equalization and correction circuit 51C performs the determination feedback equalization processing on the output of the third level conversion circuit 41C.

The four comparators 52AA-52AD compare outputs of the four addition circuits 51AA-51AD with the reference voltage, respectively, and output "1" when each of the outputs is larger than the reference voltage and otherwise, output "0" when each of the outputs is smaller than the reference voltage. The four comparators 52BA-52BD and the four comparators 52CA-52CD compare outputs of the four addition circuits 51BA-51BD with the reference voltage and outputs of the four addition circuits 51CA-51CD with the reference voltage, respectively.

The four first latch circuits 53AA-53AD latch the outputs of the four comparators 52AA-52AD at the rise of the CLK and hold the outputs. The four first latch circuits 53BA-53BD latch the outputs of the four comparators 52BA-52BD at the rise of the CLK and hold the outputs. The four first latch circuits 53CA-53CD latch the outputs of the four comparators 52CA-52CD at the rise of the CLK and hold the outputs.

The MUX 54A selects one of the outputs of four first latch circuits 53AA-53AD according to the output of the decoder 56. Specifically, the MUX 54A selects the output of the first latch circuit 53AA when a value of the reception data ahead of 1UI output from the decoder 56 is "3." In the following, similarly, the MUX 54A selects the output of the first latch circuit 53AB, the first latch circuit 53AC, and the first latch circuit 53AD when the value of the reception data ahead of 1UI output from the decoder 56 is "2," "1," and "0," respectively. Similarly, the MUXs 54B and 54C select the outputs of the first latch circuits 53BA-53BD and the first latch circuits 53CA-53CD according to the output of the decoder 56.

Three second latch circuits 55A-55C latch the outputs of the MUXs 54A-54C at the rise of the CLK and hold the outputs, respectively. The decoder 56 determines the output data having four-level (two bits) from the outputs of the second latch circuits 55A-55C and generate the output data.

As illustrated in FIG. 6, in a case of the four-level pulse amplitude modulation (PAM4) by using the PAM, each of the MUXs 54A-54C needs to know "0" or "1" of a high-order bit and "0" or "1" of a low-order bit of the data in order to select a single signal from four input signals. Therefore, each of the MUXs 54A-54C is controlled by two control signals. Here, in the PAM4, since three shift signals are generated in order to determine amplitude information having four-level, three MUXs are required in the DFE for the PAM4. Accordingly, the decoder 56 for generating two signals that control the MUXs from three signals output from the MUXs is used.

Figure 7A:
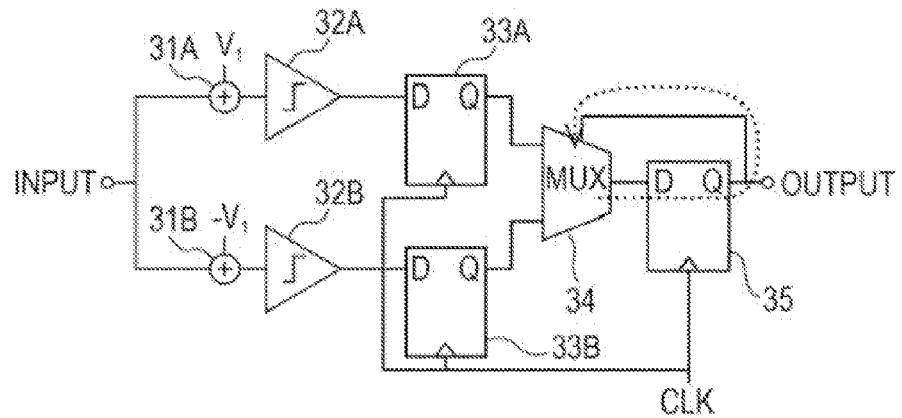
FIGS. 7A and 7B are diagrams for a comparison between delays by the MUXs in the speculative type DFE for a case of two-level modulation of FIG. 3 and the speculative type DFE of for a case of four-level modulation FIG. 6.
Figure 7B:
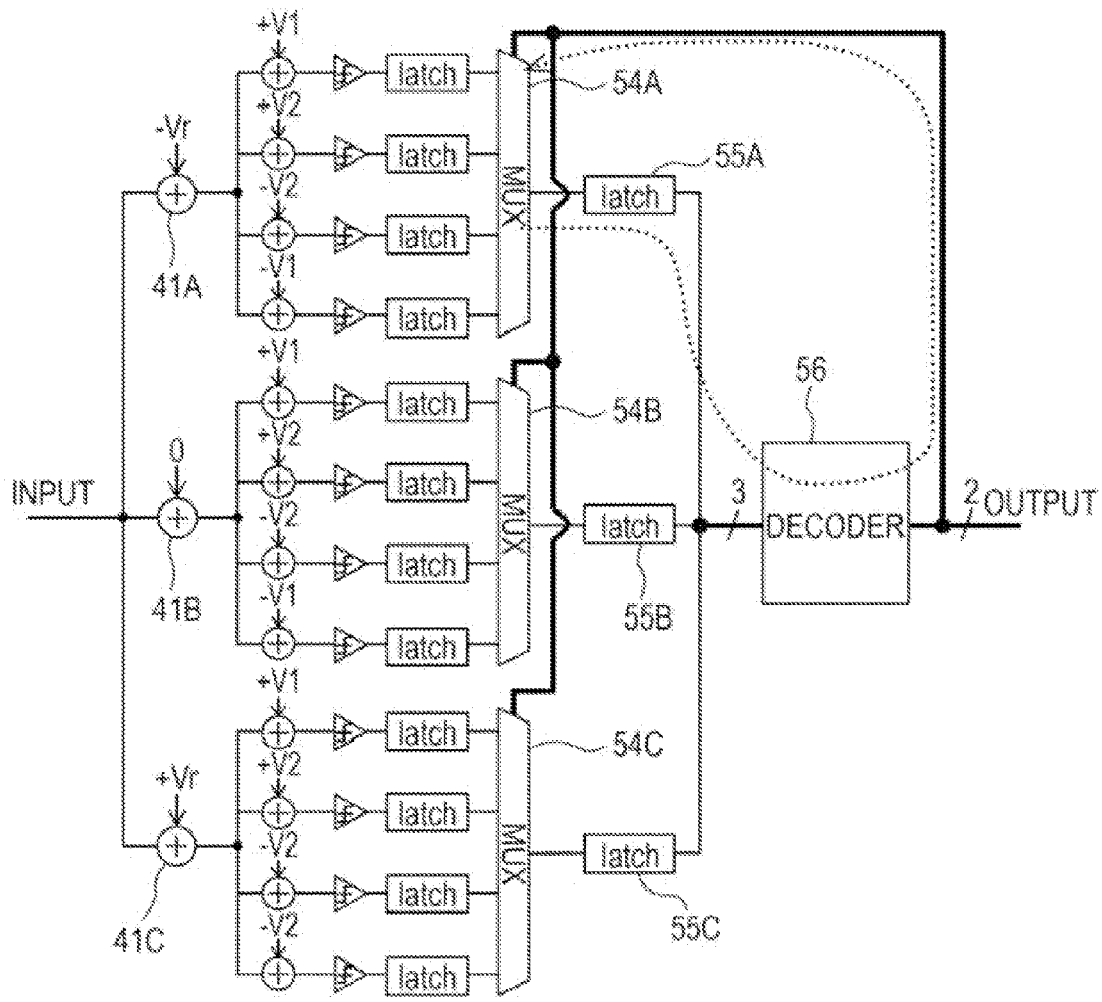

FIGS. 7A and 7B are diagrams for a comparison between delays by the MUXs in the speculative type DFE for a case of two-level modulation of FIG. 3 and the speculative type DFE for a case of four-level modulation of FIG. 6, and FIG. 7A illustrates the delay in a case of a circuit for the two-level modulation of FIG. 3 and FIG. 7B illustrates the delay in a case of a circuit for the four-level modulation of FIG. 6.

As illustrated in FIG. 7A, in a case of the circuit for the two-level modulation, the output data of the latch circuit 35 may be used as a selection signal in the MUX 34 as it is. In contrast, in a case of the circuit for the four-level modulation illustrated in FIG. 7B, the decoder 56, which was not required in a circuit for two-level modulation, is added in order to decode three outputs of three latch circuits 55A-55C. Therefore, the delay time of the signal route for controlling the MUXs 54A-54C is increased by a delay time of the decoder. As a result, the operation speed of the DFE becomes slower and it becomes difficult to further increase the data rate.

The equalizer according to embodiments to be described below is the speculative type DFE receiving the multi-level amplitude modulated data, and may be applied to the data signal having a high data rate by reducing the delay time of the signal route for controlling the MUX that constitutes the DFE.

Figure 8:
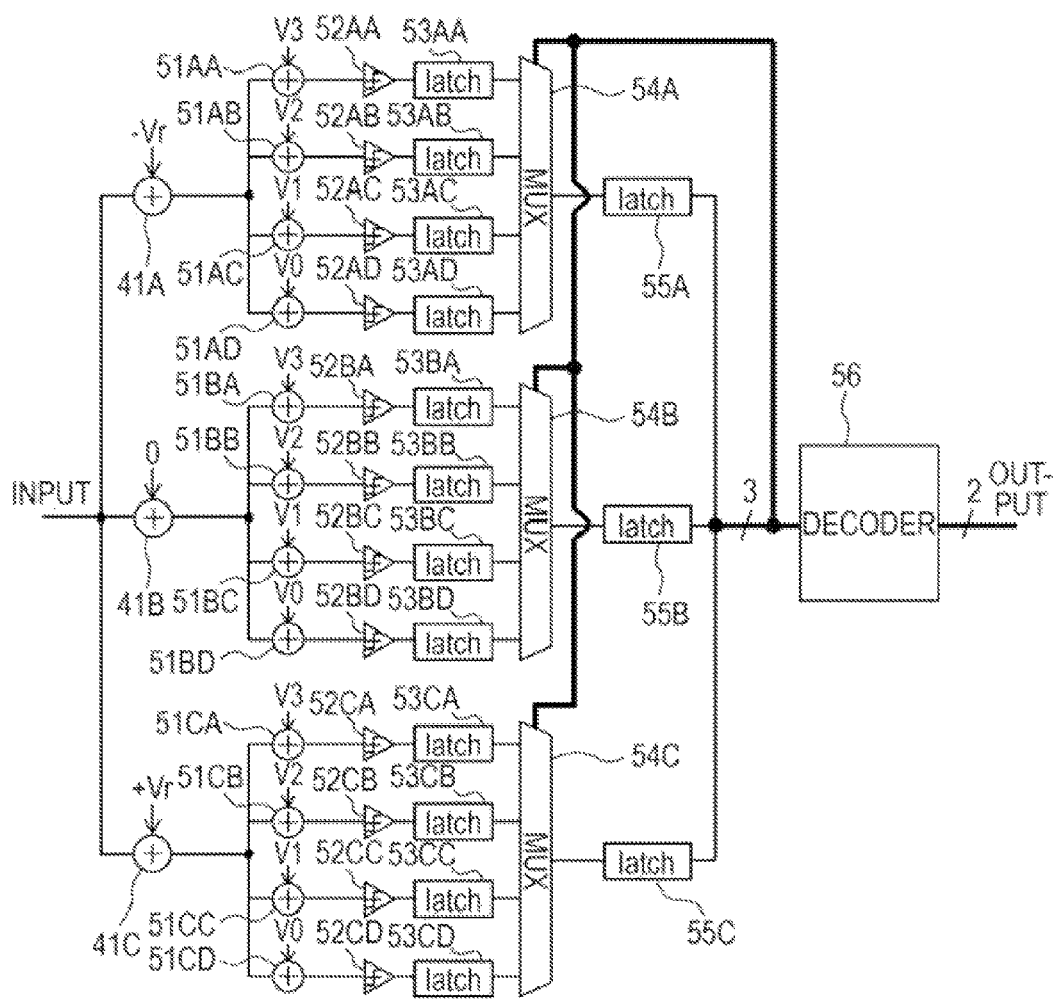
FIG. 8 is a diagram illustrating a configuration of a speculative type DFE which receives four-level amplitude modulated data of a first embodiment.

FIG. 8 is a diagram illustrating a configuration of a speculative type DFE which receives four-level amplitude modulated data of a first embodiment.

As illustrated in FIG. 8, the DFE of the first embodiment includes three level conversion circuits 41A-41C, 3×4 addition circuits 51AA-51CD, 3×4 comparators (comparison circuits) 52AA-52CD, and 3×4 first latch circuits 53AA-53CD. The DFE of the first embodiment further includes three MUXs 54A-54C, three second latch circuits 55A-55C, and a decoder 56. The 3×4 addition circuits 51AA-51CD form three sets of determination feedback equalization and correction circuits. The configuration of the DFE described above is the same as the configuration of the DFE of FIG. 6 but, the DFE of the first embodiment is different from the DFE of FIG. 6 in that the outputs of three second latch circuits 55A-55C are used as selection signals for three MUXs 54A-54C.

The DFE of the first embodiment performs control of three selection circuits (MUXs) 54A-54C by using the output signals of three second latch circuits 55A-55C without using the output signal of the decoder 56. Accordingly, since the delay time of the signal route for controlling three MUXs 54A-54C is reduced by a delay time due to the decoder 56, it becomes possible to operate the DFE at a higher speed and implement a high data rate even when a transmission scheme is the multi-level modulation.

Figures 10A, 10B:
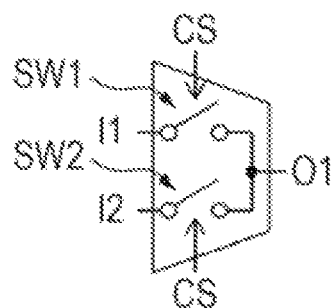
FIG. 10A is a diagram illustrating a specific configuration of the MUX illustrated in FIG. 9
FIG. 10B is a table illustrating a relation between values of the reception data signal which is an input and data values input to a decoder.

FIG. 9 is a diagram illustrating an example of a specific configuration of a MUX of the speculative type DFE of the first embodiment. FIG. 10A is a diagram illustrating a specific configuration of the MUX illustrated in FIG. 9, and FIG. 10B is a table illustrating a relationship between the values of the reception data signal which is an input and data values input to a decoder.

The value (level) of the reception data signal takes one of four levels of "0," "1," "2," and "3" and the outputs (S1, S2, and S3) of the latch circuits 55A-55C are represented as illustrated in FIG. 10B according to the value of the reception data signal. That is, when the input data is "3", S1=1, S2=1, S3=1 respectively. When the input data is "2", S1=0, S2=1, and S3=1, respectively. When the input data is "1", S1=0, S2=0, and S3=1, respectively. When the input data is "0", S1=0, S2=0, and S3=0, respectively.

As illustrated in FIG. 10A, the respective MUXs 541A-543A, 541B-543B, and 541C-543C have the same configuration and include two selection switches SW1 and SW2. The SW1 is turned ON (brought into conduction) when the control signal CS is "1" and turned OFF (brought into interruption) when the control signal CS is "0." The SW2 is turned ON (brought into conduction) when the control signal. CS is "0" and turned OFF (brought into interruption) when the control signal CS is "1." In other words, when one of the SW1 and SW2 is turned ON, the other of SW1 and SW2 is turned OFF. Accordingly, when the CS is "1," the MUX selects an input I1 and outputs the input I1 as an output O1 and otherwise, when the CS is "0," the MUX selects an input I2 and outputs the input I2 as an output O1.

As illustrated in FIG. 9, the MUX 54A includes a first stage including the MUXs 541A and 542A and a second stage including a MUX 543A. The MUX 541A uses the output S1 of the latch circuit 55A as the control signal, and selects the output of the latch circuit 53AA when S1=1 and the output of the latch circuit 53AB when S1=0. The MUX 542A uses the output S3 of the latch circuit 55C as the control signal, and selects the output of the latch circuit 53AC when S3=1 and the output of the latch circuit 53AD when S3=0. The MUX 543A uses the output S2 of the latch circuit 55B as the control signal, and selects the output of the MUX 541A when S2=1 and the output of the MUX 542A when S2=0.

Since MUXs 54B and 54C also have the same configuration as that of the MUX 54A and perform the same operations as those of the MUX 54A except that the control signals to be input are different, descriptions of the MUXs 54B and 54C will be omitted.

Both of the first latch circuits 53AA-53CD and the second latch circuits 55A-55C perform the latch operation synchronously with the rise of the CLK.

Figure 12:
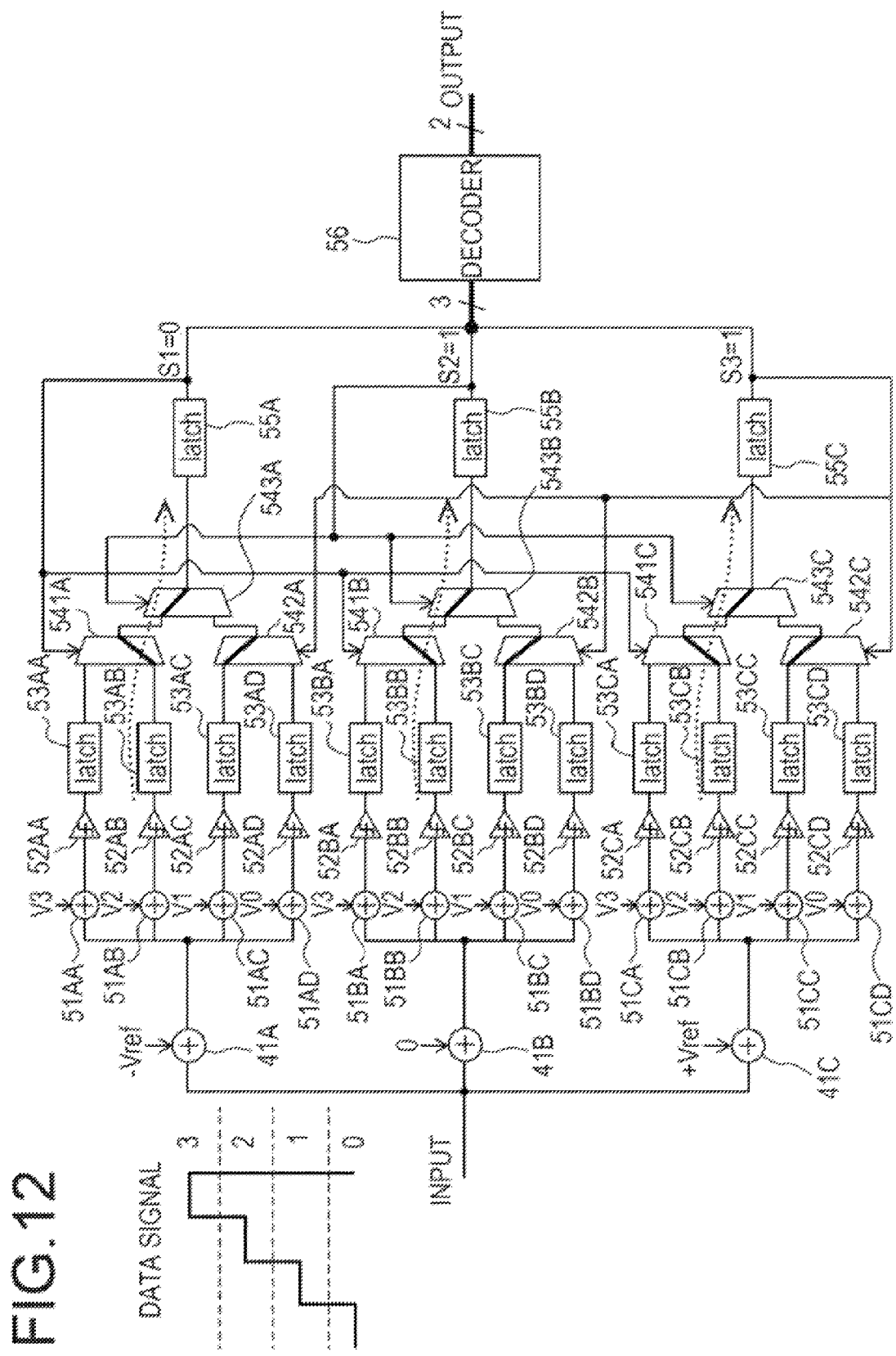
FIG. 12 is a diagram illustrating a signal route in the DFE of FIG. 9 when a value of the reception data signal ahead of 1UI is "2"

FIG. 11 is a diagram illustrating a signal route in the DFE of FIG. 9 when the value of the reception data signal ahead of 1UI is "3". FIG. 12 is a diagram illustrating a signal mute in the DFE of FIG. 9 when the value of the reception data signal ahead of 1UI is "2."

Figure 13:
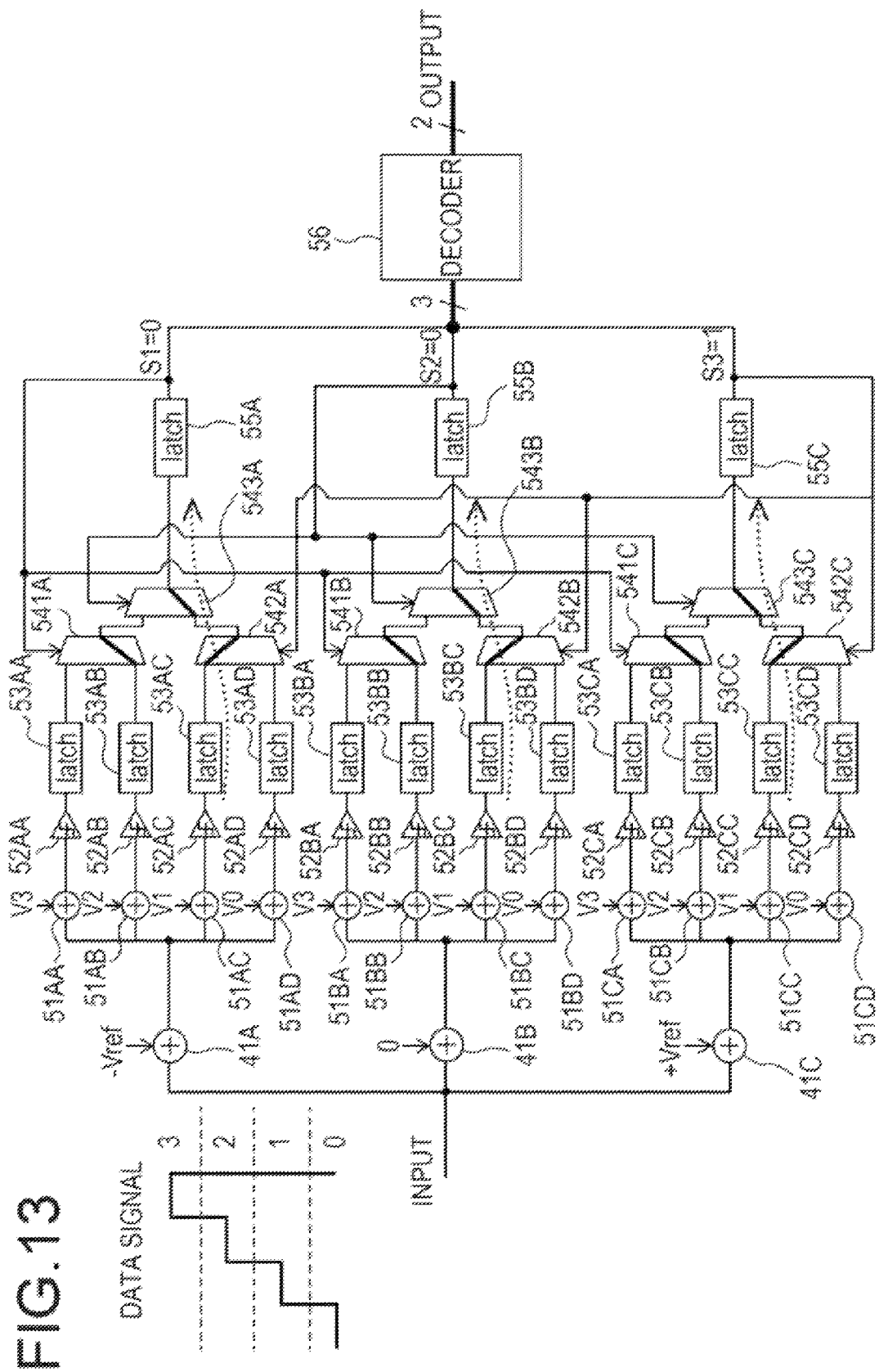
FIG. 13 is a diagram illustrating a signal route in the DFE of FIG. 9 when a value of the reception data signal ahead of 1UI is "1"
Figure 14:
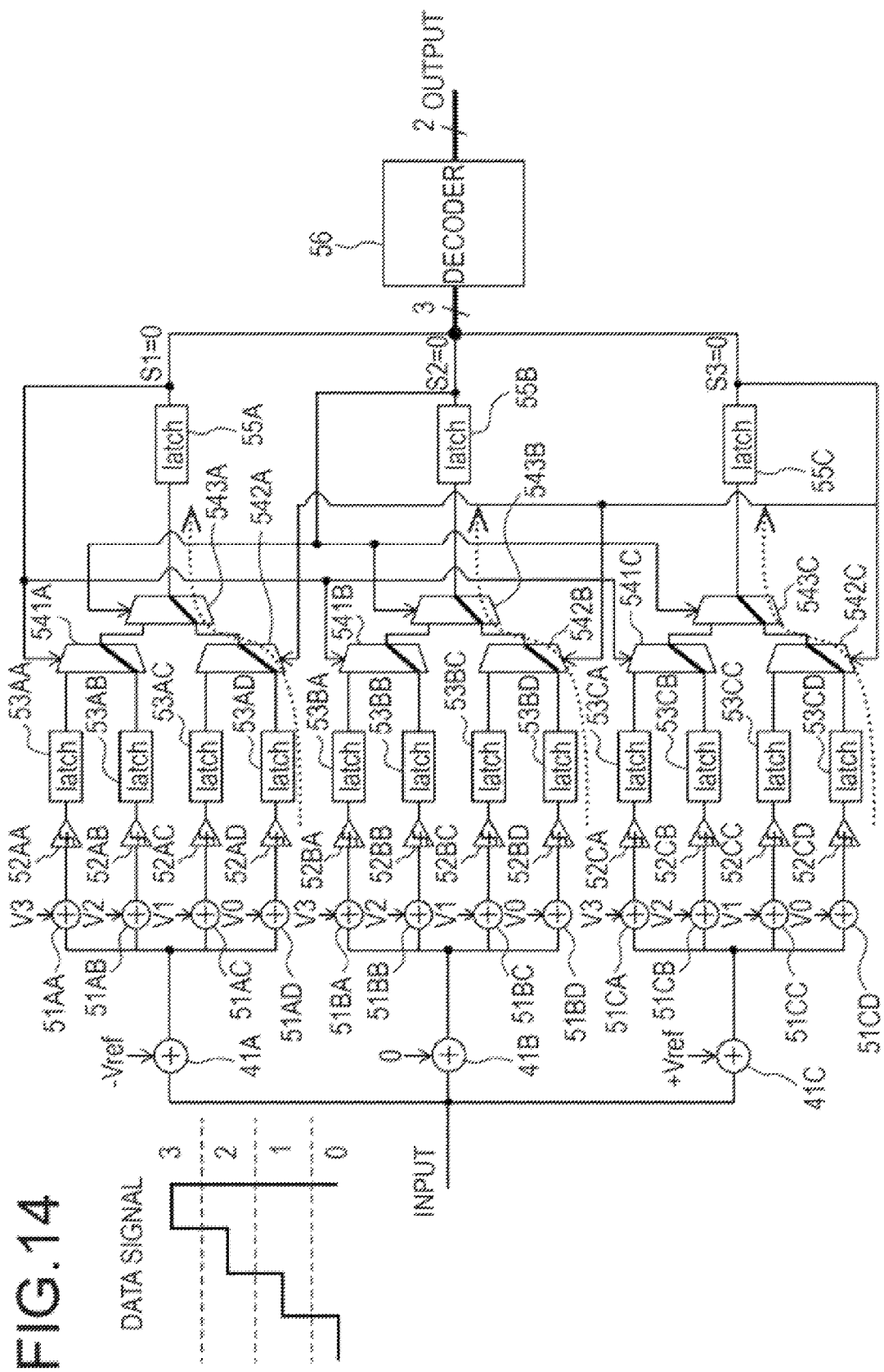
FIG. 14 is a diagram illustrating a signal route in the DFE of FIG. 9 when a value of the reception data signal ahead of 1UI is "0"

FIG. 13 is a diagram illustrating a signal route in the DFE of FIG. 9 when the value of the reception data signal ahead of 1UI is "1." FIG. 14 is a diagram illustrating a signal route in the DFE of FIG. 9 when the value of the reception data signal ahead of 1UI is "0."

When the value of the reception data signal ahead of 1UI is "3," that is, all of the outputs S1, S2, and S3 of the latch circuits 55A-55C are "1," three signal routes represented by the dotted line in FIG. 11 are selected. The first signal route is a signal route in which the input reception data signal is input to the latch circuit 55A through the level conversion circuits 41A and 51AA, the comparator 52AA, the latch circuit 53AA, and the MUXs 541A and 543A. The second signal route is a signal route in which the input reception data signal is input to the latch circuit 55B through the level conversion circuits 41B and 51BA, the comparator 52BA, the latch circuit 53BA, and the MUXs 541B and 543B. The third signal route is a signal route in which the input reception data signal is input to the latch circuit 55C through the level conversion circuits 41C and 51CA, the comparator 52CA, the latch circuit 53CA, and the MUXs 541C and 543C. Accordingly, three data for which the DFE processing is made when the value of the reception data signal ahead of 1UI is "3" are in a state of being prepared for inputting to the latch circuits 55A-55C regarding the shift signals for which three types of shifts are performed according to the levels ("3," "2," "1," and "0") capable of being taken by the reception data signal. Accordingly, in the state, the reception data for which the DFE processing is finished is capable of being immediately latched at the next rise of CLK.

When the value of the reception data signal ahead of 1UI is 2, that is the output (S1) of the latch circuit 55A is "0" and the outputs S2 and S3 of the latch circuits 55B and 55C are "1," three signal routes represented by the dotted line in FIG. 12 are selected. When the value of the reception data signal ahead of 1UI is "1," that is, the outputs S1 and S2 of the latch circuits 55A and 55B are "0" and the output S3 of the latch circuit 55C is "1," three signal routes represented by the dotted line in FIG. 13 are selected. Further, when the value of the reception data signal ahead of 1UI is "0" that is, all of the outputs S1, S2, and S3 of the latch circuits 55A-55C are "0," three signal routes represented by the dotted line in FIG. 14 are selected. Descriptions of the selection of the signal routes are similar to descriptions in FIG. 11 and thus the descriptions thereof will be omitted.

As described above, the MUX may perform desired operations even without using the output signal of the decoder 56 in the first embodiment. As a result, since the delay time of the signal route for controlling the MUX is reduced by a delay time caused by the decoder, it becomes possible to operate the DFE at a higher speed and implement a high data rate.

Figure 15:
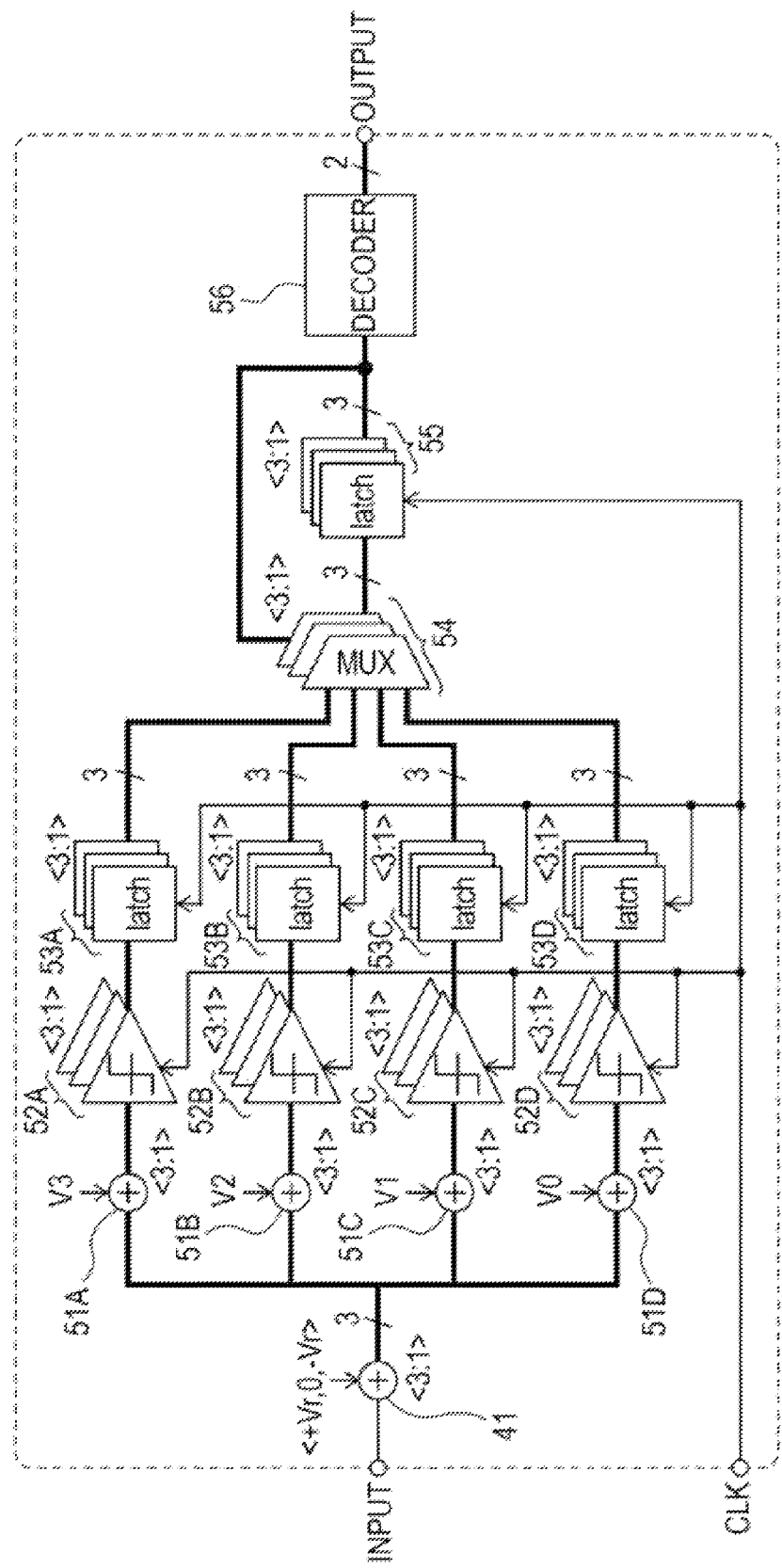
FIG. 15 is a diagram schematically illustrating the configuration of the speculative type DFE of the first embodiment of FIG. 9 by integrating and simplifying some constitutional elements of the speculative DFE.

FIG. 15 is a diagram schematically illustrating the configuration of the speculative type DFE of the first embodiment of FIG. 9 by integrating and simplifying some constitutional elements of the speculative type DFE.

In FIG. 15, the level conversion circuit group 41 includes level conversion circuit 41A-41C. The addition circuit group 51A includes addition circuits 51AA, 51BA, and 51CA. The addition circuit group 51B includes addition circuits 51AB, 51BB, and 51CB. The addition circuit group 51C includes addition circuits 51AC, 51BC, and 51CC. The addition circuit group 51D includes addition circuits 51AD, 51BD, and 51CD.

The comparator group 52A includes comparators 52AA, 52BA, and 52CA. The comparator group 52B includes comparators 52AB, 52BB, and 52CB. The comparator group 52C includes comparators 52AC, 52BC, and 52CC. The comparator group 52D includes comparators 52AD, 52BD, and 52CD.

The latch circuit group 53A includes latch circuits 53AA, 53BA, and 53CA. The latch circuit group 53B includes latch circuits 53AB, 53BB, and 53CB. The latch circuit group 53C includes latch circuits 53AC, 53BC, and 53CC. The latch circuit group 53D includes latch circuits 53AD, 53BD, and 53CD.

The MUX group 54 includes MUX 54A, 54B, and 54C. The latch circuit group 55 includes latch circuits 55A, 55B, and 55C. Hereinafter, descriptions be made using representations as illustrated in FIG. 15.

Figure 16:
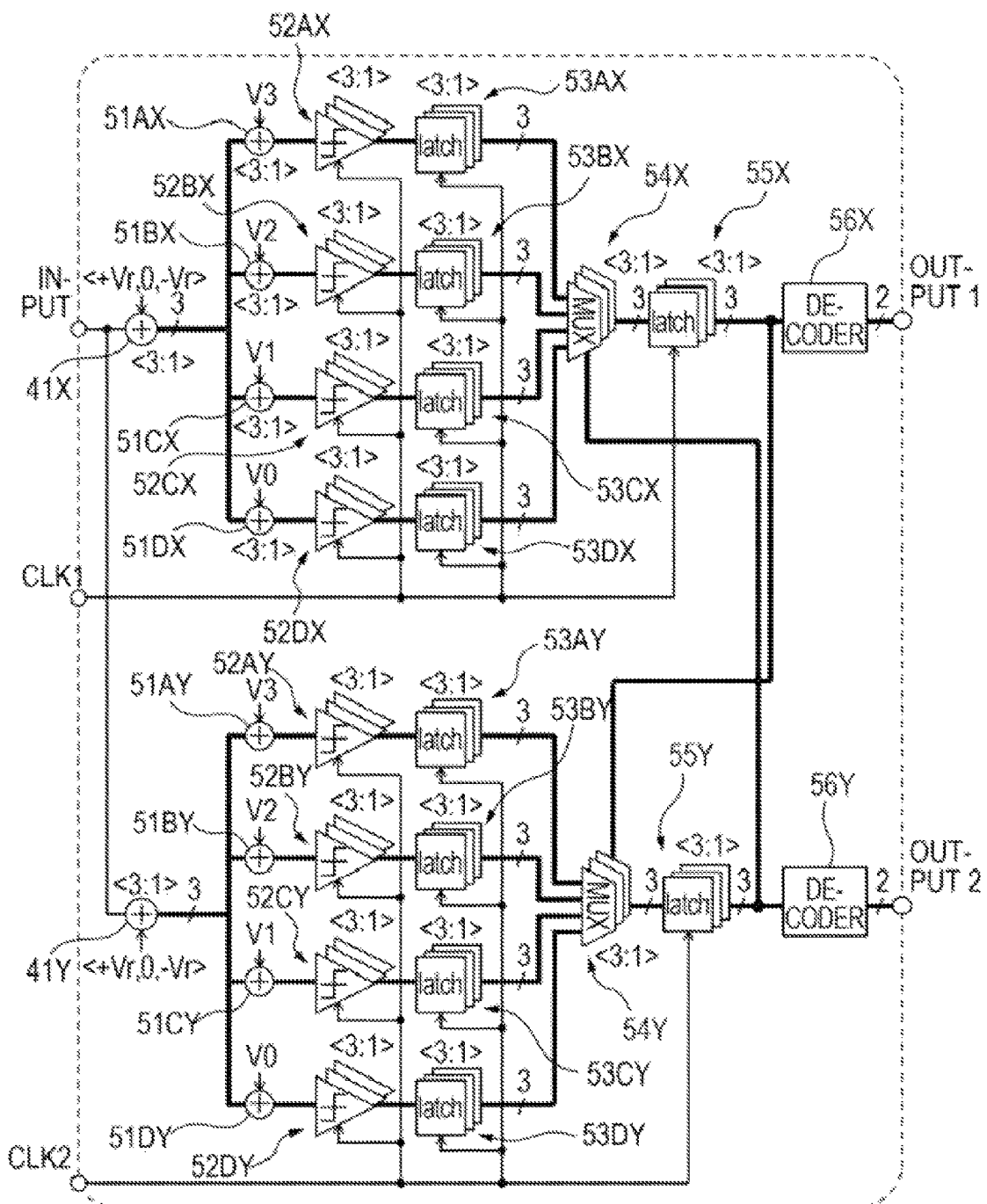
FIG. 16 is a diagram illustrating a configuration of a speculative type DFE of a second embodiment.
Figure 17:
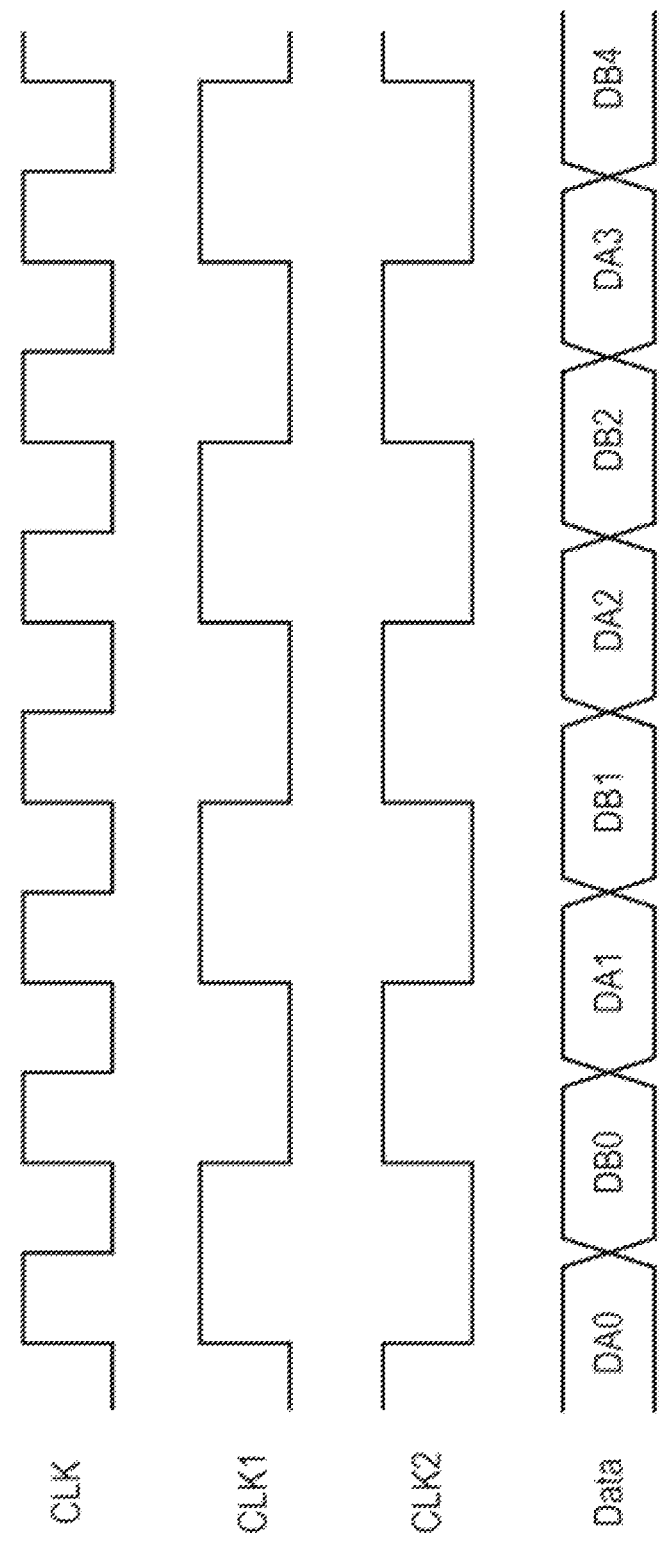
FIG. 17 is a time chart illustrating a relation between a reception data signal and a reception clock in the second embodiment.

FIG. 16 is a diagram illustrating a configuration of a speculative type DFE of a second embodiment. FIG. 16 illustrates the DFE of the second embodiment in a simplified format of FIG. 15. FIG. 17 is a time chart illustrating a relation between a reception data signal and a reception clock in the second embodiment. FIG. 18 is a table illustrating a relationship between the values of the reception data signal and data values input to two decoders in the second embodiment.

As illustrated in FIG. 17, 1UI of the reception data signal (Data) equals one period of the reception clock CLK. Here, the reception clock (CLK) is also referred to as a reference clock. The CLK1 and CLK2 are clocks obtained by subjecting the CLK to ½ frequency-division, and the clock signals are inverted with respect to each other. The reception data signal (Data) is the data signal transmitted by an interleave operation alternately arranging odd-numbered data (DA0, DA1, . . . ) and even-numbered data (DB0, DB1, . . . ). The CLK1 rises at an intermediate phase of a changing edge of the odd-numbered data (DA0, DA1, . . . ) and the CLK2 rises at an intermediate phase of a changing edge of the even-numbered data (DB0, DB1, . . . ). In the second embodiment, the reception data signal (Data) may take a value of four-level similarly as in the first embodiment.

With respect to the values of "0," "1," "2," and "3" of the odd-numbered data and the even-numbered data, the output values (S1X-S3X and S1Y-S3Y) of the latch circuit group 55X input to two decodes 56X and 56Y are listed as illustrated in FIG. 18. That is, the reception data signal in the second embodiment is the same as the first embodiment except that the output values (S1X-S3X and S1Y-S3Y) are parallel with each other.

In the DFE of the second embodiment, two DFEs of the first embodiment are provided in parallel with each other, and an input common to two DFES, the clock CLK1 for one of the DFEs, and the clock CLK2 for the other of the DFEs are supplied to the DFEs. The operations of two DFEs are the same as the DFE of the first embodiment and thus, detailed descriptions thereof will be omitted.

In the second embodiment, since the output signals of the decoders are not required to be used for the control of the MUX even when 2-parallel interleave operations are performed, it becomes possible to operate the DFE at a higher speed and implement a high data rate.

Figure 19:
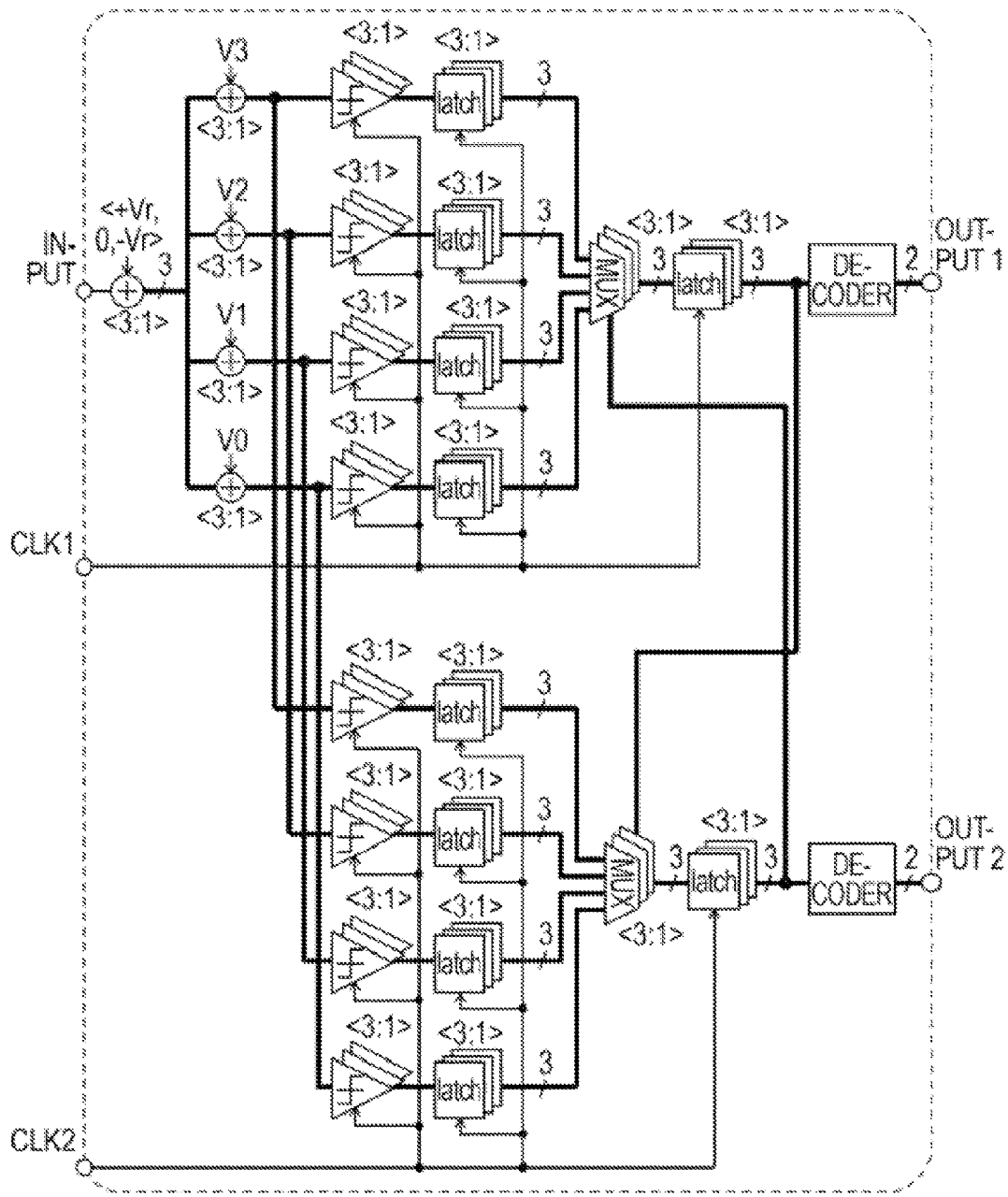
FIG. 19 is a diagram illustrating a configuration of a speculative type DFE of a third embodiment.

FIG. 19 is a diagram illustrating a configuration of a speculative type DFE of a third embodiment.

The DFE of the third embodiment is formed by combining the level conversion circuit groups 41X and 41Y into one common level conversion circuit group and combining the addition circuit groups 51AX-51DX and 51AY-51DY into one common addition circuit group, in the DFE of the second embodiment. It is possible to reduce the number of components and the circuit scale by combining the components of the DFE into the common component.

In the DFEs of the second and third embodiments, transmitted data are received by using the interleave operation which alternately arranges two data but, data more than two may be transmitted by the interleave operation.

Figure 20:
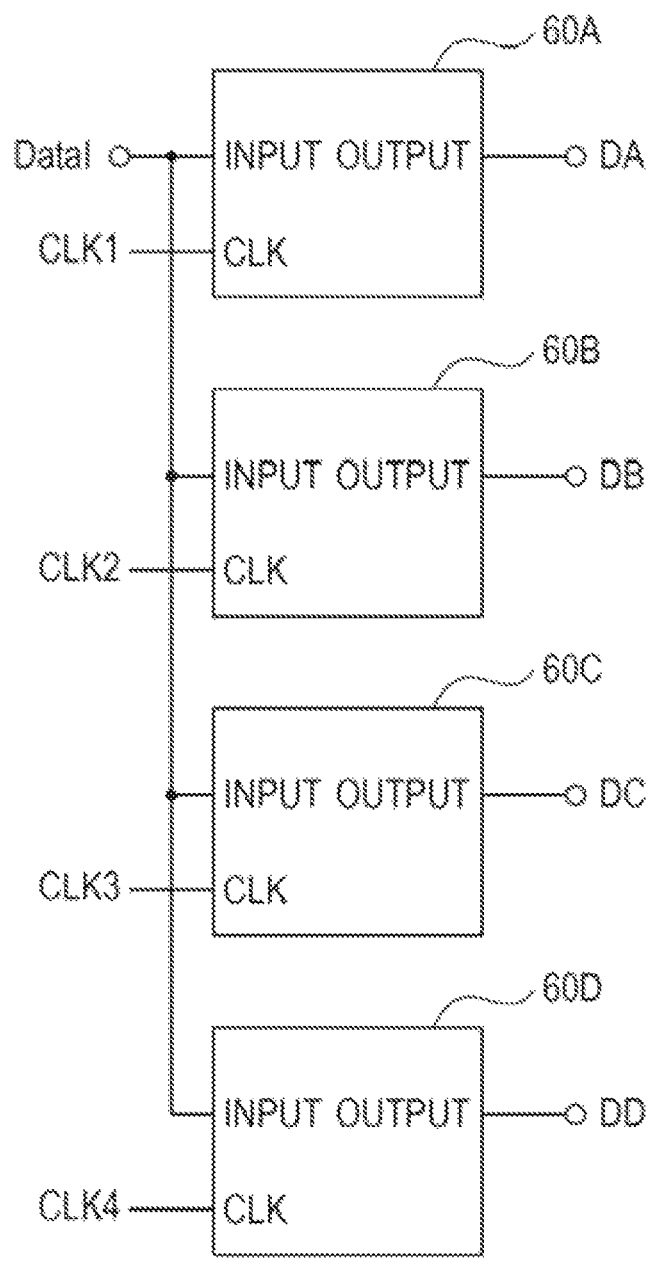
FIG. 20 is a diagram illustrating a configuration of a speculative decision feedback equalizer (DFE) of a fourth embodiment.

FIG. 20 is a diagram illustrating a configuration of a speculative type DFE of a fourth embodiment. The DFE of the fourth embodiment receives four data transmitted by using the interleave operation. In the DFE of the fourth embodiment, four DFEs 60A-60D are provided in parallel and an input common to four DFEs, and the clocks CLK1 to CLK4 are supplied to the DFEs, respectively. Each of the DFEs 60A-60D has the same configuration as the DFE of the first embodiment. The clocks CLK1 to CLK4 are clocks obtained by subjecting a reference clock CLK of which period is 1UI of the reception data signal ¼ frequency-division and phases of the clocks CLK1 to CLK4 are deviated from each other by n/2, that is, by 1UI. The 2-bit outputs DA-DD of the DFEs 60A-60D change in an interleaving manner. The operation of each of the four DFEs is the same as in the first embodiment and thus, detailed descriptions thereof will be omitted.

In the fourth embodiment, since the output signals of the decoders are not required to be used for the control of the MUX even when 4-parallel interleave operations are performed, it becomes possible to operate the DFE at a higher speed and implement a high data rate.

In the first embodiment to the fourth embodiment, the reception data signal is subjected to the four-level pulse amplitude modulation (PAM4) but, the pulse amplitude modulation having more than four-level state value may also be applied to the reception data signal.

Figure 21:
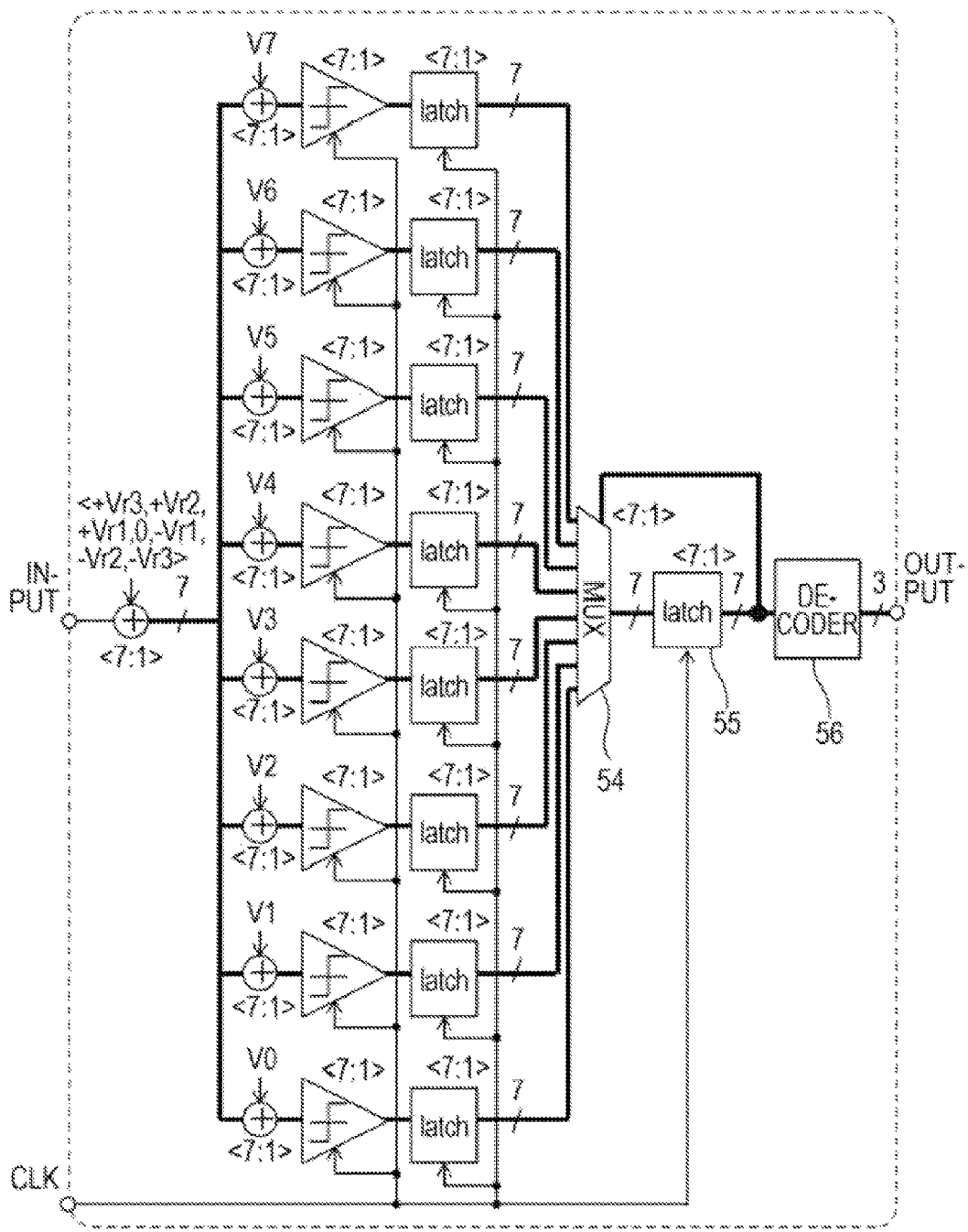
FIG. 21 is a diagram illustrating a configuration of a speculative type of a fifth embodiment.

FIG. 21 is a diagram illustrating a configuration of a speculative type DFE of a fifth embodiment. FIG. 22 is a table illustrating a relation between values of the reception data signal and data values input to two decoders in the fifth embodiment.

The DFE of the fifth embodiment receives the data signal subjected to the eight-level pulse amplitude modulation (PAM8). The level conversion circuit group includes seven level conversion circuits so as to generate seven shift signals. The outputs of the level conversion circuit group are divided into eight groups by being corresponded to eight data values, and each group includes an addition circuit group, a comparator group, and a latch circuit group, and each of the addition circuit group, the comparator group, and the latch circuit group includes seven sub-circuits by being corresponded to seven shift signals. The MUX 54 selects seven data S1 to S7 from the outputs of 7×8 latch circuits according to the output of the latch circuit group 55. The latch circuit group 55 latches and holds the data S1 to S7 synchronously with the rise of the CLK. The decoder 56 determines the value of the reception data as any one of "0" to "7" from the data S1 to S7 according to the table of FIG. 22.

Figure 23:
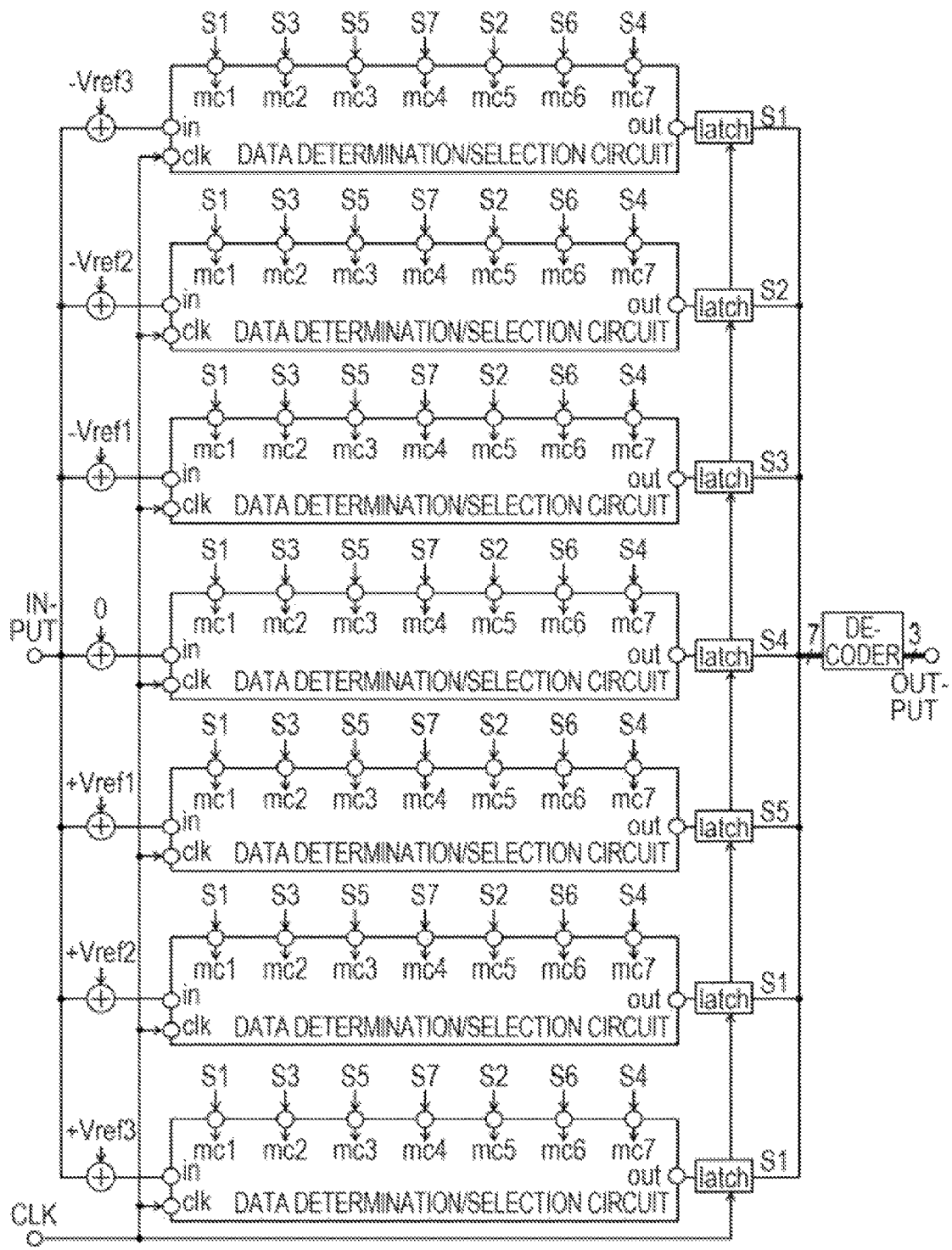
FIG. 23 is a diagram illustrating the configuration of the DFE of the fifth embodiment without simplifying the configuration of the DFE.
Figure 24:
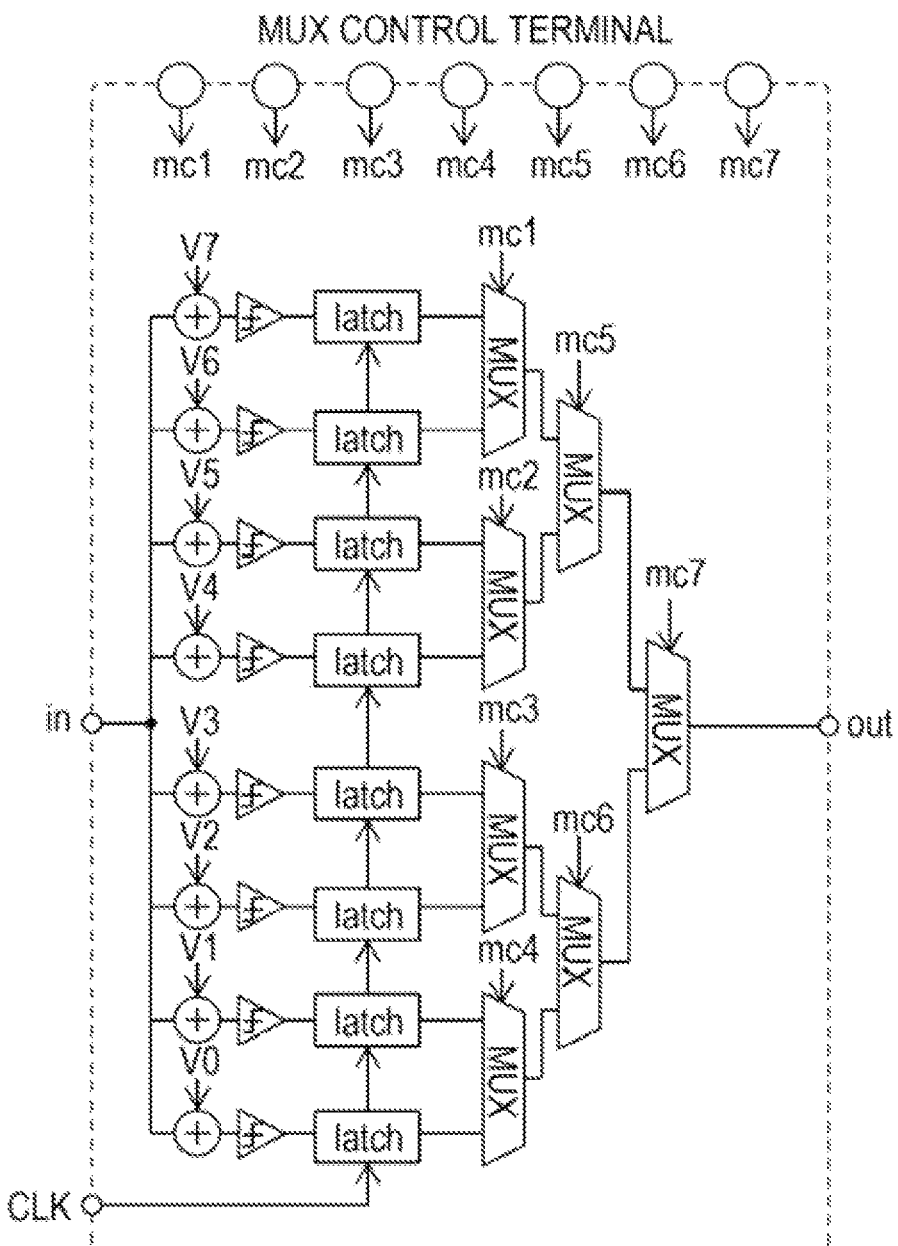
FIG. 24 is a diagram illustrating a detailed circuit configuration of a single data determination/selection circuit of FIG. 23.

FIG. 23 is a diagram illustrating the configuration of the DFE of the fifth embodiment without simplifying the configuration of the DFE. FIG. 24 is a diagram illustrating a detailed circuit configuration of a single data determination/selection circuit of FIG. 23.

Each data determination/selection circuit of FIG. 23 performs the DFE processing according to eight data values ahead of 1UI, especially, outputs S1 to S8 of the second latch circuit group with respect to each of seven shift signals generated by the addition circuit group provided at the first stage.

As illustrated in FIG. 24, each data determination/selection circuit includes eight addition circuits, eight comparators, eight first latch circuits, and the MUX provided with seven 2:1 MUXs. In the DFE of the fifth embodiment, eight-level pulse amplitude modulated reception data signals are received, seven shift signals are generated, the DFE processing according to eight-level is performed but, the basic operations are the same as the first embodiment and thus, detailed descriptions thereof will be omitted.

Figure 25A:
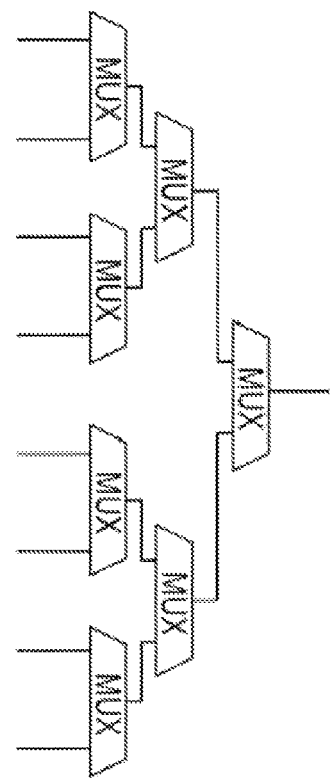
FIGS. 25A, 25B, and 25C are diagrams each illustrating a configuration of the MUX of the fifth embodiment.
Figure 25B:
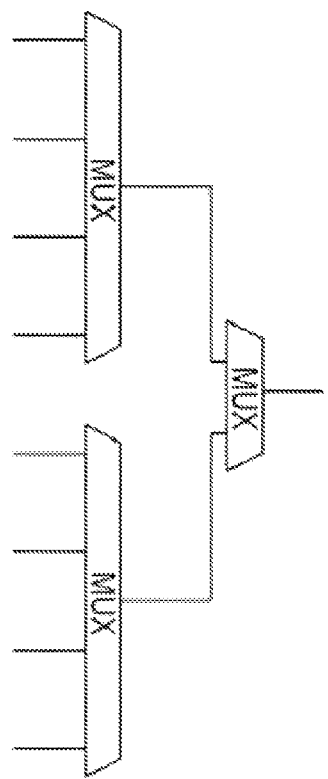
Figure 25C:
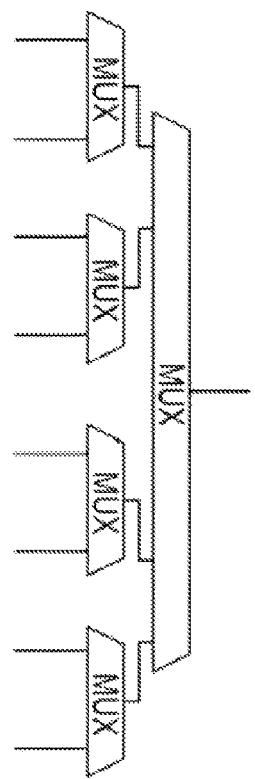

FIGS. 25A, 25B, and 25C are diagrams illustrating a configuration of the MUX in the fifth embodiment. FIG. 25A illustrates an example of a configuration of the MUX in the fifth embodiment illustrated in FIG. 24. In the example of the configuration, among seven 2:1 MUXs, four 2:1 MUXs are arranged in the first stage, two 2:1 MUXs are arranged in the second stage, and one 2:1 MUX is arranged in the third stage. Accordingly, a delay which amounts to a total of delays caused by the 2:1 MUXs arranged in three stages occurs until an input to the MUX is output.

FIG. 25B illustrates an example in which the 2:1 MUXs arranged in the first stage and the second stage in the configuration of FIG. 25A are replaced by 4:1 MUXs. FIG. 25C illustrates an example in which the 2:1 MUXs arranged in the second stage and the third stage in the configuration of FIG. 25A are replaced by 4:1 MUXs. When the 4:1 MUXs are used, the circuit scale becomes larger compared with the case where three 2:1 MUXs are used but, the delay may be made small.

As described above, in the fifth embodiment, since the output signals of the decoders are not required to be used for the control of the MUX even when the data signal having a value of eight-level is used, it becomes possible to operate the DFE at a higher speed and implement a high data rate.

Figure 26:
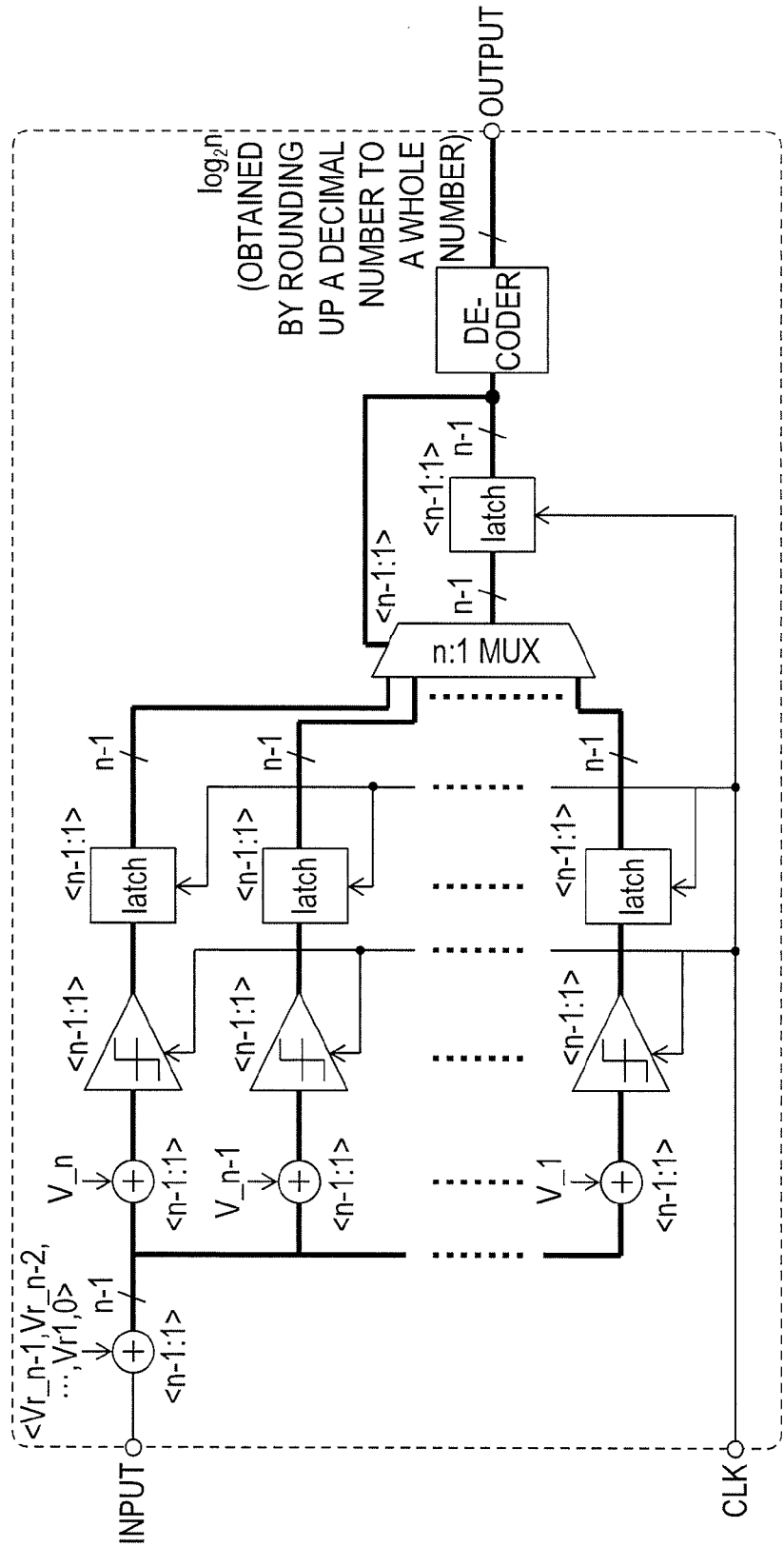
FIG. 26 is a diagram illustrating a configuration of a speculative type DFE of a sixth embodiment.

FIG. 26 is a diagram illustrating a configuration of a speculative type DFE of a sixth embodiment. FIG. 27 is a table illustrating a relation between a value "n" of the reception data signal, the number of bits of the decoder corresponding to the value, and log 2 (n) in the sixth embodiment.

The DFE of the sixth embodiment receives n-level pulse amplitude modulated data signal. The DFE of FIG. 8 corresponds to the DFE in a case where the value "n" is set to 4, that is, n=4, in the sixth embodiment and the DFE of FIG. 21 corresponds to the DFE in a case where the value "n" is set to 8, that is, n=8, in the sixth embodiment.

The number of bits of the output of the decoder necessary for a case where the number of amplitude modulation levels is "n" is expressed by log 2 (n). Since the number of bits is an integer number, a value of log 2 (n) becomes a value obtained by rounding up a decimal number to a whole number.

In the foregoing, descriptions has been made on the first embodiment to the sixth embodiment. Next, descriptions will be made on an example on which the DFE of the embodiments is applied to a transceiver circuit.

Figure 28:
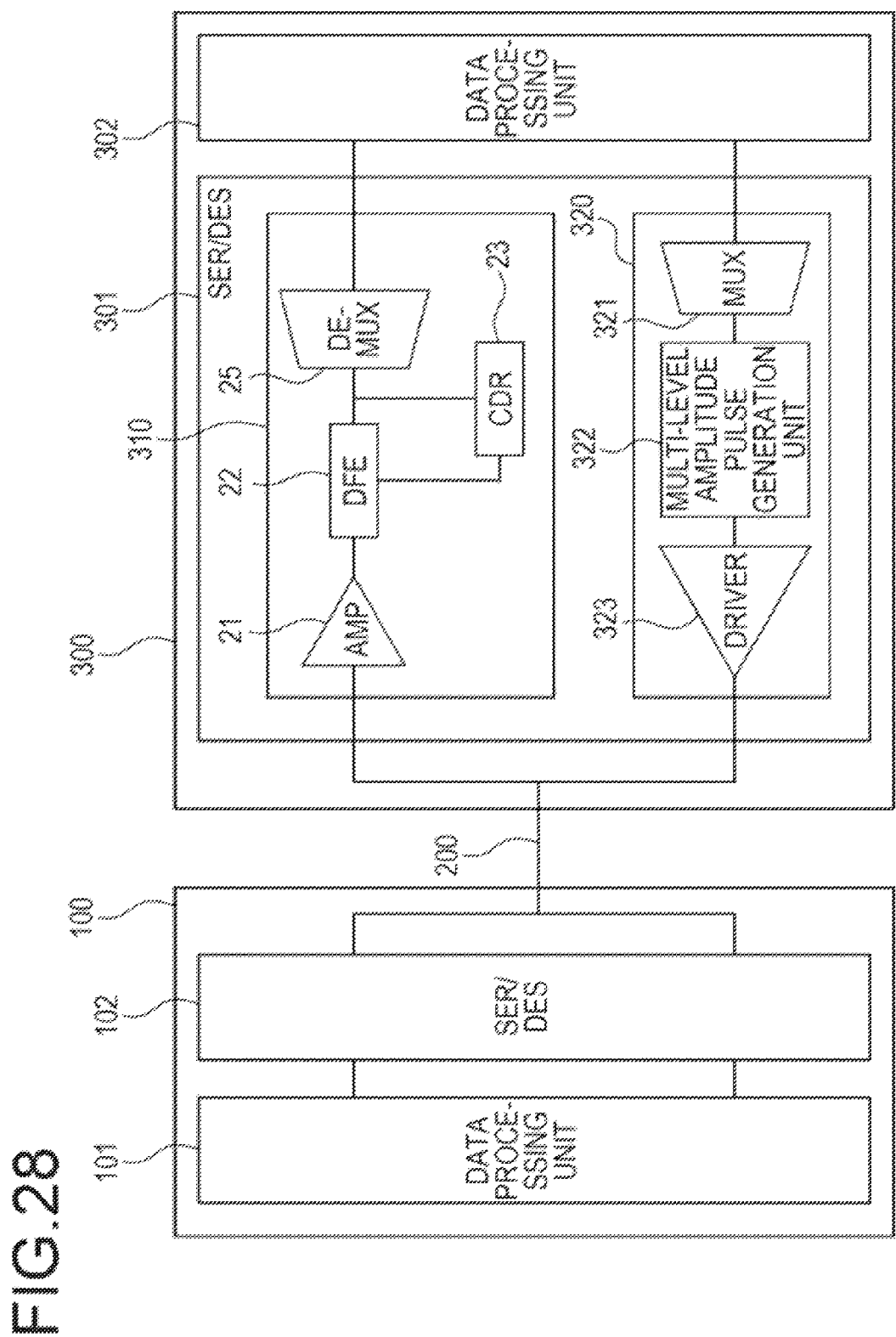
FIG. 28 is a diagram illustrating an example of a configuration of a communication system including a transceiver circuit to which the DFE of the embodiments is applied.

FIG. 28 is a diagram illustrating an example of a configuration of a communication system including a transceiver circuit to which the DFE of the embodiments is applied.

The communication system of FIG. 28 includes a first circuit 100, a transmission path 200, and a second circuit 300. The first circuit 100 and the second circuit 300 communicate with each other through the transmission path 200.

The first circuit 100 includes a data processing unit 101 and a SER/DES circuit 102 that transmits and receives data for the second circuit 300 through the transmission at 200. In a case of transmitting data, the SER/DES circuit 102 receives parallel data from the data processing unit 101, converts the parallel data into serial data, and transmits the converted serial data. Further, in a case of receiving data, the SER/DES circuit 102 converts the received serial data into parallel data and outputs the converted parallel data to the data processing unit 101.

In a case where the DFE of the embodiments is applied, since the SER/DES circuit 102 performs the multi-level amplitude modulation on the data, the number of bits of the serial data is decreased by that much. For example, in a case of transmitting 8-bit parallel data, the SER/DES circuit 102 converts 8-bit parallel data into 2-bit parallel×4-bit serial data, performs the four-level (two bits) amplitude modulation on the data and transmits 4-bit data in serial.

The second circuit 100 includes a data processing unit 302 and a SER/DES circuit 301 which transmits and receives data for the first circuit 100 through a transmission path 200. The SER/DES circuit 301 of the second circuit 300 may be implemented by the same circuit as the SER/DES circuit 102 of the first circuit 100. Here, details of the SER/DES circuit 301 of the second circuit 300 will be described by way of an example.

The SER/DES circuit 301 includes a reception circuit 310 and a transmission circuit 320. The reception circuit 310 includes the preamplifier 21, the speculative decision feedback equalizer (DFE) 22, and the CDR 23 as illustrated in FIG. 1. In the example of FIG. 28, the reception circuit 310 includes a DEMUX 25. The DEMUX 25 converts serial data output from the DFE 22 into parallel data and outputs the parallel data to the data processing unit 302. For example, as described above, it is assumed that the data to be received is the data signal transmitted after 8-bit parallel data are converted into 2-bit parallel×4-bit serial data and the four-level (two bits) amplitude modulation is performed on the 2-bit parallel×4-bit serial data. In this case, the DFE 22 generates 2-bit reception data from the four level (two bits) amplitude modulated reception data signal, and the DEMUX 25 receives the generated 2-bit reception data four times, and then generates 8-bit parallel data and outputs the 8-bit parallel data to the data processing unit 302.

The transmission circuit 320 includes a MUX 321, a multi-level amplitude use generation unit 322, and a driver 321. The MUX 321 receives parallel data transmitted from the data processing unit 302 and converts the received parallel data into 2-bit parallel×4-bit serial data. The multi-level amplitude pulse generation unit 322 generates pulse amplitudes corresponding to four-level (two bits) amplitude modulation according to the 2-bit parallel data and outputs the generated pulse amplitudes to the driver 323. The driver 323 outputs the four-level (two bits) amplitude modulated data signal to the transmission path 200.

All examples and conditional language recited herein are intended for pedagogical purpose aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A decision feedback equalizer for N-level amplitude modulated signal of a reception data, wherein N is an integer of 4 or more, the decision feedback equalizer comprising:
(N−1) level conversion circuits configured to add (N−1) shifting voltages to the N-level amplitude modulated signal respectively to generate (N−1) level shifted signals;
(N−1)×N determination feedback equalization and correction circuits configured to perform N types of decision feedback equalization processing, each of which adding each of N-level offset voltages corresponded to any one of N levels of the reception data ahead of one data cycle, on each of the (N−1) level shifted signals to generate (N−1) sets of N equalization correction signals;
(N−1)×N comparison circuits configured to compare the N equalization correction signals in each of the (N−1) sets with a reference voltage;
(N−1)×N first latch circuits configured to latch comparison results of N comparison circuits in each of the (N−1) sets;
(N−1) selection circuits configured to select a single comparison result among the comparison results of the N comparison circuits in each of the (N−1) sets, wherein the (N−1) selection circuits are arranged in at least a first stage and a second stage for selecting the single comparison result;
(N−1) second latch circuits configured to latch outputs of the second stage of (N−1) selection circuits; and
a decoder configured to decode the outputs of the (N−1) second latch circuits to determine output data having N levels,
wherein each of the (N−1) selection circuits is configured to select an equalization correction signal among the N equalization correction signals in each of the (N−1) sets according to outputs latched by the (N−1) second latch circuits.

2. The decision feedback equalizer according to claim 1, wherein N is $2^k$, wherein k is an integer of 2 to 3.

3. The decision feedback equalizer according to claim 2, wherein the (N−1) selection circuits are arranged at k stages for selecting the single comparison result, and the stage arranged at an i-th stage of the k stages includes $2^{k-i}$ 2:1 selection circuits, wherein i is an integer of 1 to 2.

4. A decision feedback equalizer for N-level amplitude modulated signal of a reception data, wherein N is an integer of 4 or more, the decision feedback equalizer comprising:
M of first decision feedback equalizer configured to obtain amplitude modulated signals having N levels at changing edges of M obtained clocks by shifting a frequency-divided clock having a period of M times a data change period of the amplitude modulated signals having N-levels by the data change period, wherein M is an integer of 2 or more,
wherein the first decision feedback equalizer including:
(N−1) level conversion circuits configured to add (N−1) shifting voltages to the N-level amplitude modulated signal respectively to generate (N−1) level shifted signals;
(N−1)×N determination feedback equalization and correction circuits configured to perform N types of decision feedback equalization processing, each of which adding each of N-level offset voltages corresponded to any one of N levels of the reception data ahead of one data cycle, on each of the (N−1) level shifted signals to generate (N−1) sets of N equalization correction signals;
(N−1)×N comparison circuits configured to compare the N equalization correction signals in each of the (N−1) sets with a reference voltage;
(N−1)×N first latch circuits configured to latch comparison results of the N comparison circuits in each of the (N−1) sets;
(N−1) selection circuits configured to select a comparison result among the comparison results of N comparison circuits in each of the (N−1) sets, wherein the (N−1) selection circuits are arranged in at least a first stage and a second stage for selecting the comparison result;
(N−1) second latch circuits configured to latch outputs of the second stage of (N−1) selection circuits; and
a decoder configured to decode the outputs of the (N−1) second latch circuits to determine output data having N levels,
wherein each of the (N−1) selection circuits is configured to select an equalization correction signal among the N equalization correction signals in each of the (N−1) sets according to outputs latched by the (N−1) second latch circuits.

5. The decision feedback equalizer according to claim 4, wherein the N is $2^k$, wherein k is an integer of 2 to 3.

6. The decision feedback equalizer according to claim 4, wherein in the M of first decision feedback equalizer, the (N−1) level conversion circuits and (N−1)×N determination feedback equalization and correction circuits in each M set are made common, respectively.

* * * * *